(12) United States Patent
Lim et al.

(10) Patent No.: US 12,728,538 B2
(45) Date of Patent: Sep. 8, 2026

(54) ROBOT AND CONTROL METHOD THEREOF

(71) Applicant: SAMSUNG ELECTRONICS CO., LTD., Suwon-si (KR)

(72) Inventors: Hyeontaek Lim, Suwon-si (KR); Saeyoung Kim, Suwon-si (KR); Yongkook Kim, Suwon-si (KR); Boseok Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 18/509,858

(22) Filed: Nov. 15, 2023

(65) Prior Publication Data

US 2024/0083033 A1 Mar. 14, 2024

Related U.S. Application Data

(63) Continuation of application No. PCT/KR2023/009025, filed on Jun. 28, 2023.

(30) Foreign Application Priority Data

Jun. 29, 2022 (KR) ........................ 10-2022-0079855

(51) Int. Cl.
*B25J 9/16* (2006.01)
*B25J 19/02* (2006.01)
(Continued)

(52) U.S. Cl.
CPC ............. *B25J 9/1694* (2013.01); *B25J 19/02* (2013.01); *B25J 19/026* (2013.01); *G06V 20/50* (2022.01);
(Continued)

(58) Field of Classification Search
CPC ........ B25J 9/1694; B25J 19/02; B25J 19/026; B25J 11/0005; B25J 19/022; B25J 13/003;
(Continued)

(56) References Cited

U.S. PATENT DOCUMENTS 8,184,843 B2 5/2012 Kim
9,516,241 B2 12/2016 Kim et al.
(Continued)

FOREIGN PATENT DOCUMENTS

JP 2020-201370 A 12/2020
JP 2021-82971 A 5/2021
(Continued)

OTHER PUBLICATIONS

Communication dated Feb. 17, 2025 issued by the European Patent Office in European Patent Application No. 23831898.4.
(Continued)

*Primary Examiner* — Rachid Bendidi
(74) *Attorney, Agent, or Firm* — Sughrue Mion, PLLC

(57) ABSTRACT

A robot includes: a light detection and ranging (LiDAR) sensor; a plurality of directional microphones; and at least one processor configured to: identify, based on sensing data obtained through the LiDAR sensor, an object in a vicinity of the robot, identify, based on the type of the object, a weight to apply to an audio signal received through a directional microphone corresponding to a location of the object from among the plurality of directional microphones, obtain context information of the robot based on the sensing data, identify, based on the context information, a pre-processing model corresponding to each directional microphone of the plurality of directional microphones, apply the weight to an audio signal received through the directional microphone corresponding to the location of the object
(Continued)

among a plurality of audio signals received through the plurality of directional microphones, obtain a plurality of pre-processed audio signals by inputting the audio signal to which the weight has been applied, and the remaining audio signals into the pre-processing model corresponding to the respective directional microphone, and perform voice recognition based on the plurality of pre-processed audio signals.

17 Claims, 13 Drawing Sheets

(51) Int. Cl.

| | |
|---|---|
| ***G06V 20/50*** | (2022.01) |
| ***G06V 40/10*** | (2022.01) |
| ***G10L 15/22*** | (2006.01) |
| ***H04R 1/02*** | (2006.01) |
| ***H04R 1/40*** | (2006.01) |
| ***H04R 3/00*** | (2006.01) |

(52) U.S. Cl.
CPC .............. *G06V 40/10* (2022.01); *G10L 15/22* (2013.01); *H04R 1/028* (2013.01); *H04R 1/406* (2013.01); *H04R 3/005* (2013.01)

(58) Field of Classification Search
CPC ........... B25J 9/163; B25J 13/08; G06V 20/50; G06V 40/10; G06V 20/00; G10L 15/22; G10L 21/0216; G10L 15/00; G10L 2021/02166; H04R 1/028; H04R 1/406; H04R 3/005
See application file for complete search history.

(56) References Cited

U.S. PATENT DOCUMENTS 11,724,397 B2 8/2023 Jeong et al.
2009/0018828 A1* 1/2009 Nakadai .................. G10L 15/20 704/E21.013
2012/0191448 A1 7/2012 Lloyd et al.
2014/0362253 A1 12/2014 Kim et al.
2016/0019887 A1 1/2016 Kim et al.
2019/0389073 A1* 12/2019 Park ........................ G10L 15/22
2020/0389724 A1 12/2020 Kamano et al.
2021/0114215 A1* 4/2021 Jeong ..................... B25J 19/023
2021/0327447 A1 10/2021 Maeng et al.
2022/0024050 A1 1/2022 Lim et al.

FOREIGN PATENT DOCUMENTS

KR 10-1806158 B1 1/2018
KR 10-2020-0095990 A 8/2020
KR 10-2150013 B1 8/2020
KR 10-2020-0116617 A 10/2020
KR 10-2020-0129219 A 11/2020
KR 10-2249392 B1 5/2021
KR 10-2021-0083094 A 7/2021
KR 10-2275873 B1 7/2021
KR 10-2323946 B1 11/2021
KR 10-2022-0008408 A 1/2022

OTHER PUBLICATIONS

International Search Report (PCT/ISA/210) issued on Oct. 13, 2023 by the International Searching Authority in International Patent Application No. PCT/KR2023/009025.
Written Opinion (PCT/ISA/237) issued on Oct. 13, 2023 by the International Searching Authority in International Patent Application No. PCT/KR2023/009025.
Office Action dated Feb. 25, 2026 issued by the Ministry of Intellectual Property in Korean in Application No. 10-2022-0079855.

* cited by examiner

FIG. 8

| SPACE | | OBJECT | | | | | | DRIVING STATE | | PRE-PROCESSING MODEL |
|---|---|---|---|---|---|---|---|---|---|---|
| ENCLOSED | OPEN | EXISTENCE | ABSENCE | NUMBER | TYPE | LOCATION | DISTANCE | TRAVELING | STATIONARY | |
| X | O | O | X | 1 | PERSON | FIRST DIRECTION | MAINTAINED | O | X | PRE-PROCESSING MODEL A |
| X | O | O | X | 1 | PERSON | FIRST DIRECTION | INCREASED | X | O | PRE-PROCESSING MODEL B |
| X | O | O | X | 2 | PERSON | FIRST AND THIRD DIRECTIONS | MAINTAINED | X | O | PRE-PROCESSING MODELS A AND B |
| X | O | O | X | 1 | WALL | SECOND DIRECTION | INCREASED | O | X | PRE-PROCESSING MODEL C |
| ⋮ | ⋮ | ⋮ | ⋮ | | | | ⋮ | ⋮ | ⋮ | ⋮ |
| O | X | X | O | - | - | - | - | O | X | PRE-PROCESSING MODEL X |
| O | X | X | O | - | - | - | - | X | O | PRE-PROCESSING MODEL Y |

FIG. 9
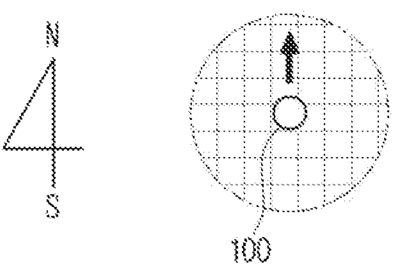
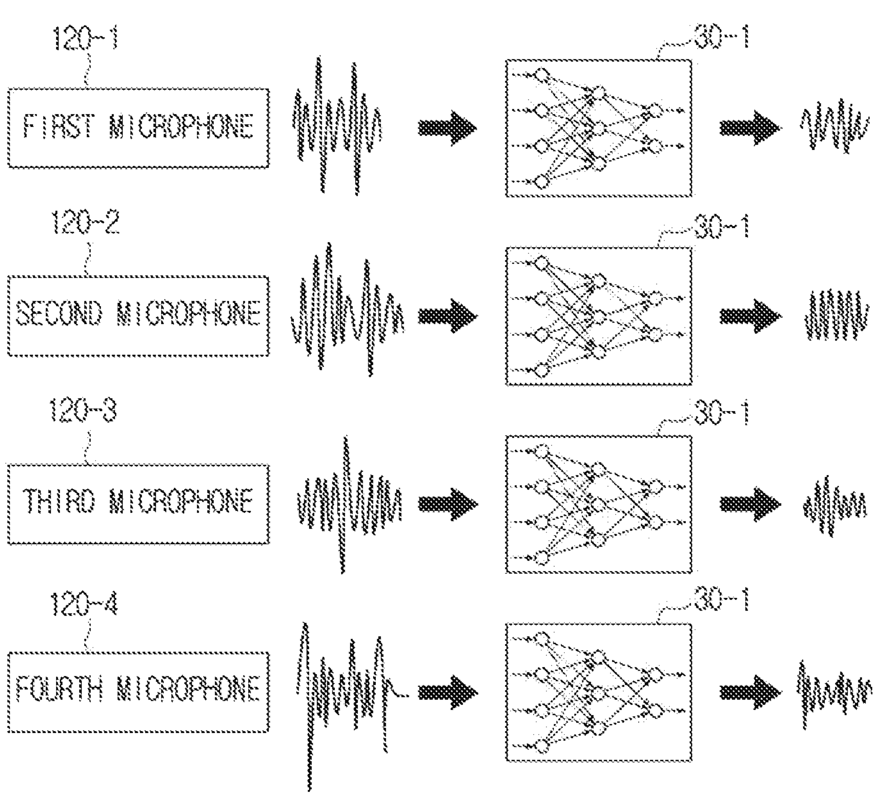

FIG. 10
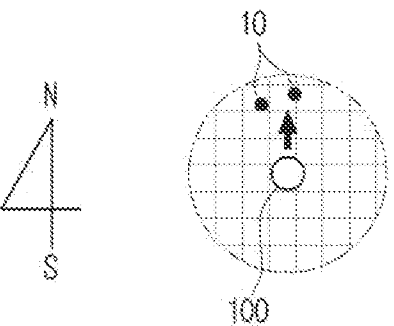
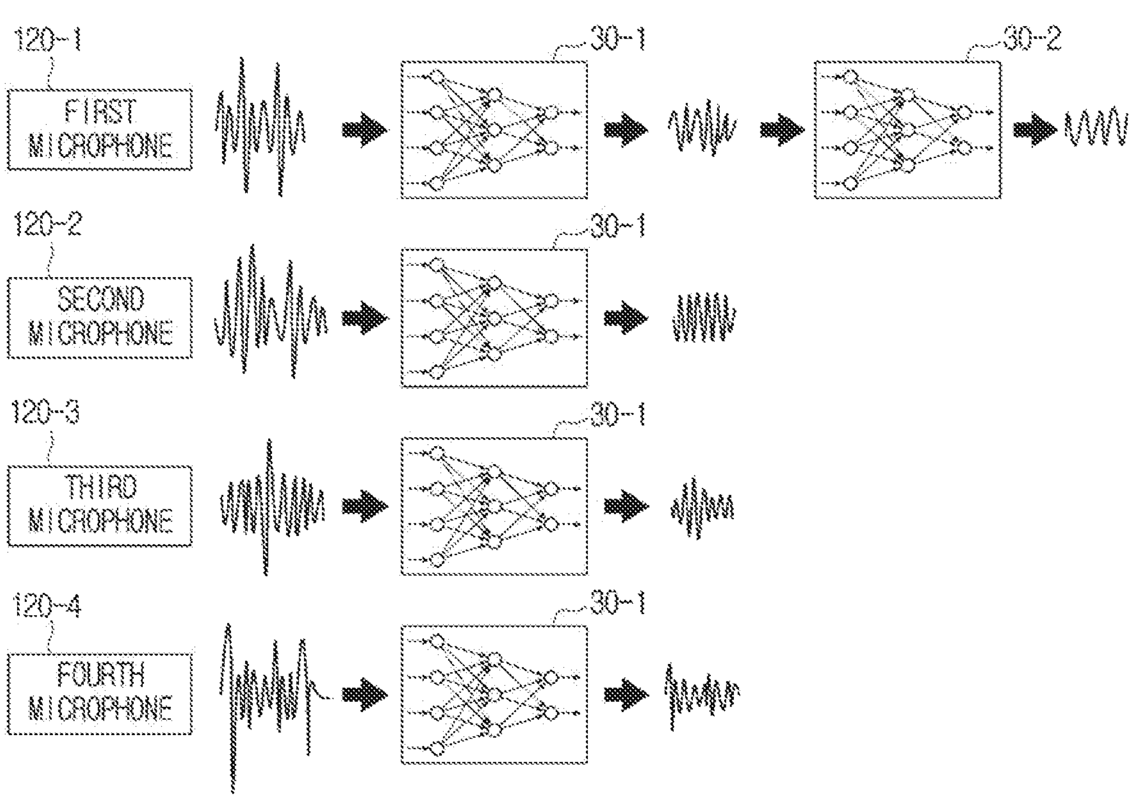

N
S
10
21
22
100
120-1
FIRST MICROPHONE
120-2
SECOND MICROPHONE
120-3
THIRD MICROPHONE
120-4
FOURTH MICROPHONE
30-1
30-3
30-2

ROBOT AND CONTROL METHOD THEREOF

CROSS-REFERENCE TO RELATED APPLICATIONS

This application is a by-pass continuation of International Application No. PCT/KR2023/009025, filed on Jun. 28, 2023, which is based on and claims priority to Korean Patent Application No. 10-2022-0079855, filed on Jun. 29, 2022, in the Korean Intellectual Property Office, the disclosures of which are incorporated by reference herein in their entireties.

BACKGROUND

1. Field

The present disclosure relates to a robot and a control method thereof, and more particularly, to a robot which may control a microphone included in the robot based on sensing data obtained using a light detection and ranging (LiDAR) sensor, and a control method thereof.

2. Description of Related Art

In recent years, in accordance with the development of electronic technology, robots have been commonly used not only in specialized technical fields or industrial fields requiring large-scale labor, but also in general homes and stores. For example, a household cleaning robot, a guide robot that guides a user in a store, a serving robot in a store, and the like may fall into this category.

In accordance with the development of voice recognition technology, the user may recently control the robot through a user voice without inputting a control command through a separate control device or interface. For voice recognition, it is necessary for the robot to receive a clear user voice. However, a case may occur in which the robot fails to fully receive the user voice due to a surrounding environment of the robot. For example, the user in a specific location may speak while the robot is surrounded by walls, and the robot may receive the user's voice together with noise reflected from the walls. In another example, a user's voice may be distorted by noise occurring around the robot.

The robot may obtain an incorrect result when performing a voice processing process such as user location identification or the voice recognition based on the voice including the noise or the distorted voice. That is, the robot may incorrectly identify a location of the user who attempts to verbally control the robot, or obtain a completely different voice recognition result from user's intention. Therefore, required is a method of obtaining a refined audio signal by processing an audio signal received by the robot in consideration of information on the surrounding environment of the robot.

SUMMARY

According to an aspect of the disclosure, a robot includes a light detection and ranging (LiDAR) sensor; a plurality of directional microphones; and at least one processor configured to: identify, based on sensing data obtained through the LiDAR sensor, an object in a vicinity of the robot, identify, based on the type of the object, a weight to apply to an audio signal received through a directional microphone corresponding to a location of the object from among the plurality of directional microphones, obtain context information of the robot based on the sensing data, identify, based on the context information, a pre-processing model corresponding to each directional microphone of the plurality of directional microphones, apply the weight to an audio signal received through the directional microphone corresponding to the location of the object among a plurality of audio signals received through the plurality of directional microphones, obtain a plurality of pre-processed audio signals by inputting the audio signal to which the weight has been applied, and the remaining audio signals into the pre-processing model corresponding to the respective directional microphone, and perform voice recognition based on the plurality of pre-processed audio signals.

The at least one processor may be further configured to based on identifying the object as a person, identify a first value as the weight to apply to the audio signal received through the directional microphone corresponding to the location of the object, and based on identifying the object as a wall, identify a second value as the weight to apply to the audio signal received through the directional microphone corresponding to the location of the object, and wherein the first value is greater than the second value.

The at least one processor may be further configured to obtain, based on the sensing data, first context information on a space in the vicinity of the robot and second context information on a driving state of the robot, and identify the pre-processing model corresponding to each directional microphone of the plurality of directional microphones based on at least one of the first context information and the second context information.

the first context information comprises at least one of information on the type of the object, information on the location of the object, information on a number of objects in the vicinity of the robot, and information on a distance between the robot and the object, and wherein the second context information comprises at least one of information on whether the robot is traveling, information on a traveling speed of the robot, and information on a traveling direction of the robot.

The at least one processor may be further configured to identify, based on the second context information, that the robot is traveling, and based on identifying that the robot is traveling, identify a pre-processing model comprising a first model as the pre-processing model corresponding to each directional microphone of the plurality of directional microphones.

The at least one processor may be further configured to, based on identifying that the robot is traveling toward the object identified as the person based on the first and second context information, identify a pre-processing model comprising the first model and a second model as the pre-processing model corresponding to the directional microphone corresponding to the location of the object, obtain a first pre-processed audio signal by inputting the audio signal to which the weight of the first value is applied to the first model, and obtain a second pre-processed audio signal by inputting the first pre-processed audio signal to the second model.

The at least one processor may be further configured to, based on identifying, based on the first context information, the object as a wall adjacent to the robot, identify a pre-processing model comprising a third model as the pre-processing model corresponding to each directional microphone of the plurality of directional microphones.

The at least one processor may be further configured to, based on identifying a plurality of objects in the vicinity of the robot and the plurality of objects as a plurality of people based on the first context information, identify a pre-processing model comprising a fourth model as the pre-processing model corresponding to each directional microphone of the plurality of directional microphones According to an aspect of the disclosure, a method of controlling a robot, includes identifying, based on sensing data obtained through a light detection and ranging (LiDAR) sensor, an object in the vicinity of the robot; identifying, based on the type of the object, a weight to apply to an audio signal received through a directional microphone corresponding to a location of the object from among plurality of directional microphones; obtaining context information of the robot based on the sensing data; identifying, based on the context information, a pre-processing model corresponding to each respective directional microphone of the plurality of directional microphones; applying the weight to the audio signal received through the directional microphone corresponding to the location of the object among a plurality of audio signals received through the plurality of directional microphones; obtaining a plurality of pre-processed audio signals by inputting the audio signal to which the weight has been applied, and the remaining audio signals into the pre-processing model corresponding to the respective directional microphone; and performing voice recognition based on the plurality of pre-processed audio signals.

The identifying the weight may further include based on identifying the object as a person, identifying a first value as the weight to apply to the audio signal received through the directional microphone corresponding to the location of the object; and based on identifying the object as a wall, identifying a second value as the weight to apply to the audio signal received through the directional microphone corresponding to the location of the object, and wherein the first value is greater than the second value.

The obtaining the context information may further include obtaining, based on the sensing data, first context information on a space in the vicinity of the robot and second context information on a driving state of the robot, and wherein the method further comprises identifying the pre-processing model corresponding to each directional microphone of the plurality of directional microphones based on at least one of the first context information and the second context information.

The first context information comprises at least one of information on the type of the object, information on the location of the object, information on a number of objects in the vicinity of the robot, and information on a distance between the robot and the object, and wherein the second context information comprises at least one of information on whether the robot is traveling, information on a traveling speed of the robot, and information on a traveling direction of the robot.

The identifying the pre-processing model further comprises, identifying, based on the second context information, that the robot is traveling, and identifying, based on identifying that the robot is traveling, a pre-processing model comprising a first model as the pre-processing model corresponding to each directional microphone of the plurality of directional microphones.

The identifying the pre-processing model may further include based on identifying that the robot is traveling toward the object identified as the person based on the first context information and the second context information, identifying a pre-processing model comprising the first model and a second model as the pre-processing model corresponding to the directional microphone corresponding to the location of the object, and wherein the obtaining the plurality of pre-processed audio signals further comprises: obtaining a first pre-processed audio signal by inputting the audio signal to which the weight of the first value is applied to the first model; and obtaining a second pre-processed audio signal by inputting the first pre-processed audio signal to the second model.

The identifying of the pre-processing model may further include, based on identifying that the object as a wall adjacent to the robot based on the first context information, identifying a pre-processing model comprising a third model as the pre-processing model corresponding to each directional microphone of the plurality of directional microphones.

According to an aspect of the disclosure, a computer-readable recording medium recording a computer program for executing the method may be further provided.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a diagram illustrating a method of identifying a pre-processing model based on context information of the robot according to an embodiment of the present disclosure;

FIG. 9 is an exemplary diagram illustrating a pre-processing model applied to the plurality of directional microphones when the robot is identified as traveling according to an embodiment of the present disclosure;

FIG. 10 is an exemplary diagram illustrating a pre-processing model applied to the plurality of directional microphones when the robot is identified as traveling toward the person according to an embodiment of the present disclosure;

DETAILED DESCRIPTION

Figure 1:
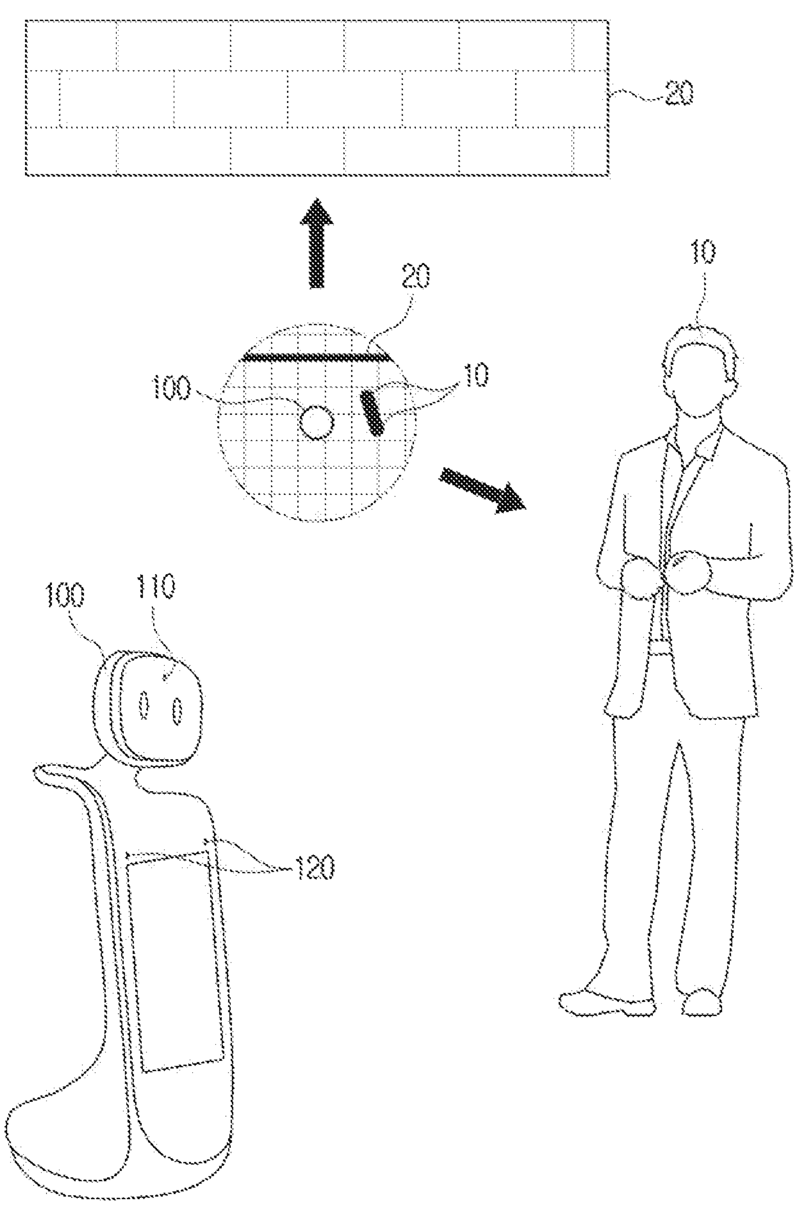
FIG. 1 is an exemplary diagram for explaining an operation of a robot according to an embodiment of the present disclosure.

Terms used in the specification or claims are selected from general terms in consideration of its function in various embodiments of the present disclosure. However, these terms may be changed based on intentions of those skilled in the art to which the present disclosure pertains, legal or technical interpretations, and emergences of new technology. In addition, some terms are arbitrarily selected by the applicant. This term may be interpreted to have the meaning defined in the specification, and if there is no specific definition of the term, the term may be interpreted based on a general content of the specification and common technical knowledge in the art.

In addition, throughout the accompanying drawings of the specification, the same reference numerals denote parts or components performing substantially the same functions. For convenience of explanation and understanding, different embodiments are described using the same reference numerals. That is, even though all the components having the same reference numerals are illustrated in a plurality of drawings, the plurality of drawings do not illustrate one embodiment.

In addition, terms including ordinal numbers, such as "first," "second" and the like, may be used to distinguish various components from each other in the specification and claims. Such ordinal numbers may be used only to distinguish the same or similar components from each other, and are not to be construed as being limited to the terms. For example, components combined with these ordinal numbers should not be limited in their order of use or placement. If necessary, the ordinal numbers may be used interchangeably.

In the specification, a term of a singular form includes its plural form unless the context clearly indicates otherwise. It is to be understood that a term "include," "formed of," or the like used in this application specifies the presence of features, numerals, steps, operations, components, parts or combinations thereof, which is mentioned in the specification, and does not preclude the presence or addition of one or more other features, numerals, steps, operations, components, parts or combinations thereof.

In embodiments of the present disclosure, a term such as a "module," "unit," "part" or the like is used to refer to a component which performs at least one function or operation. This component may be implemented by hardware or software or implemented by a combination of hardware and software. In addition, the plurality of "modules," "units," "parts" or the like may be integrated in at least one module or chip and be implemented by at least one processor except for each of the plurality of "modules," "units," "parts" or the like which needs to be implemented by a specific hardware.

In addition, in embodiments of the present disclosure, it is to be understood that when one part is referred to as being connected to another part, the one part may be not only directly connected to another part but may also be indirectly connected to another part through a third medium. In addition, unless explicitly described otherwise, any statement suggesting the inclusion of any components is understood to imply the inclusion of other components rather than the exclusion of any other components.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, various embodiments of the present disclosure are described in detail with reference to the accompanying drawings.

FIG. 1 is an exemplary diagram for explaining an operation of a robot according to an embodiment of the present disclosure.

Referring to FIG. 1, a robot 100 according to an embodiment of the present disclosure may obtain information on an object around (in a vicinity of) the robot 100 through a LiDAR sensor 110. The information on an object may include a type of the object and information on a distance between the robot and the object.

Here, when the objects located around the robot 100 are identified as a person 10 and a wall 20, respectively, the robot 100 may predict that an audio signal, in particular, an audio signal including a voice command for controlling the robot 100, is to be output from the object identified as the person 10.

Accordingly, the robot 100 may increase intensity of the audio signal obtained through the directional microphone in a direction corresponding to a location of the object identified as the person 10 among the audio signals received through a plurality of directional microphones 120. This configuration is to perform voice recognition more smoothly by increasing the intensity of the audio signal predicted to include the voice command for controlling the robot 100.

In addition, the robot 100 may identify a surrounding environment of the robot 100 to identify a pre-processing model for pre-processing the received audio signal. As shown in FIG. 1, the robot 100 is adjacent to the wall. In this situation, the robot 100 may receive not only a voice directly uttered by a user, but also a noise occurring when a user voice is reflected from the wall. As a result, the robot 100 may be required to perform the voice recognition or voice processing for identifying user location through a distorted user voice including the noise. This configuration may lead to a result in which the robot 100 obtains an incorrect voice recognition result or identifies the user location as an incorrect location.

Therefore, the robot 100 according to an embodiment of the present disclosure may identify an appropriate pre-processing model to be applied to the audio signal received by the robot 100 in consideration of the surrounding environment of the robot 100. Hereinafter, an embodiment of the present disclosure is described in detail with reference to FIGS. 2 through 13.

Figure 2:
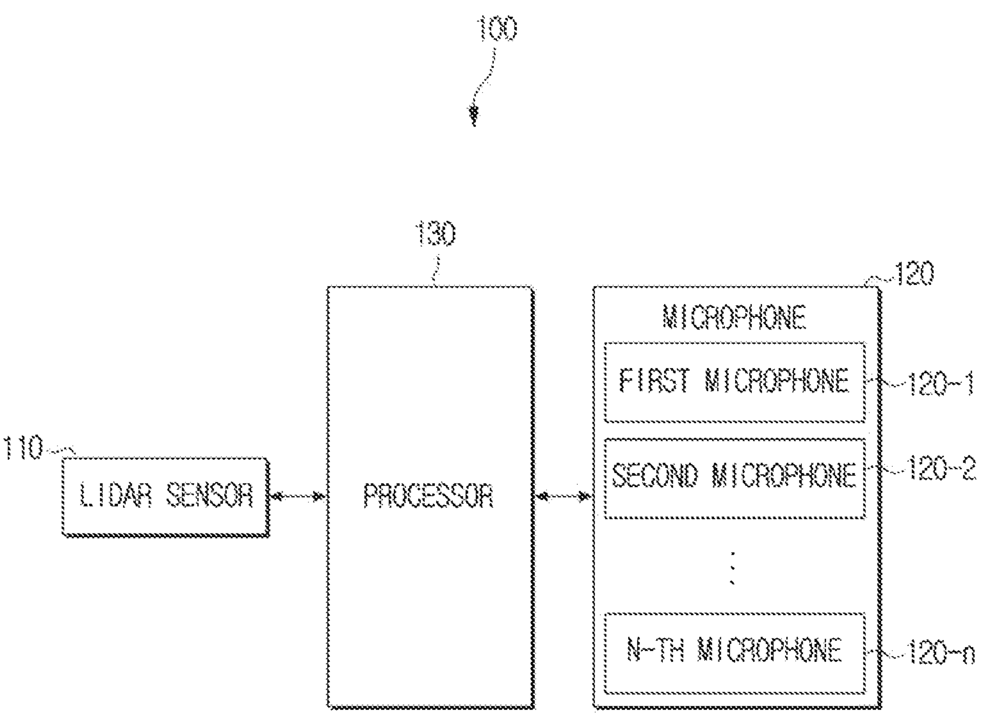
FIG. 2 is a schematic configuration diagram of the robot according to an embodiment of the present disclosure.
Figure 3:
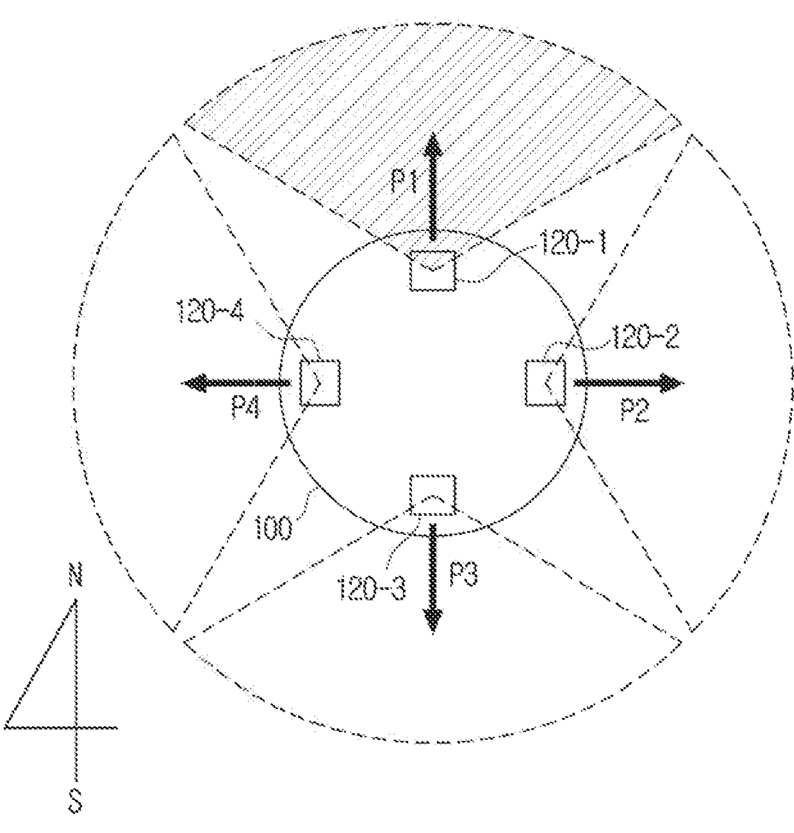
FIG. 3 is a diagram for explaining a plurality of directional microphones according to an embodiment of the present disclosure.

FIG. 2 is a schematic configuration diagram of the robot according to an embodiment of the present disclosure. FIG. 3 is a diagram for explaining the plurality of directional microphones according to an embodiment of the present disclosure.

The robot 100 according to an embodiment of the present disclosure may include the LiDAR sensor 110, the plurality of directional microphones 120, and a processor 130.

The robot 100 may obtain information on a distance to the object (e.g., person, obstacle, or wall) existing around the robot 100 by using the LiDAR sensor 110. Specifically, the LiDAR sensor 110 may be rotated by 360° and irradiate a laser to the object located within a predetermined radius around the robot 100, and detect the distance to the object based on a time the laser is received when receiving the laser which is irradiated from the sensor and then reflected from the object. Alternatively, the LiDAR sensor 110 may detect the distance to the object by measuring an amount of phase change of the received laser.

The LiDAR sensor 110 may include a light emitting unit outputting the laser and a receiving unit receiving the laser reflected from the object after being output from the light emitting unit. The object may include the person located around the robot 100, the obstacle, the wall, an electronic device, or the like.

The plurality of directional microphones (a first directional microphone 120-1, a second directional microphone 120-2, . . . , and an n-th directional microphone **120-*n*, in which "n" is a natural number greater than or equal to 2) may obtain the audio signals around the robot 100. Specifically, each directional microphone (the first directional microphone 120-1, the second directional microphone 120-2, . . . , and the n-th directional microphone 120-*n*, hereinafter denoted by 120**) may be a microphone configured to selectively obtain only narrow-angle sound coming from a specific direction.

Here, the audio signal may include not only the user voice for controlling the robot 100, but also various audio signals generated around the robot 100.

According to an embodiment of the present disclosure, directional directions of the plurality of directional microphones 120 may be set to be different from each other so as not to overlap each other. Here, the plurality of directional microphones 120 may be disposed in the robot 100 to correspond to different directional directions. In addition, each directional microphone may obtain the audio signal coming from each directional direction within a predetermined directional angle or range.

In this regard, FIG. 3 shows that four directional microphones are disposed in the robot 100 to respectively correspond to east, west, south, and north directions of the robot 100.

Here, the first directional microphone 120-1 disposed in the robot 100 may obtain the audio signal transmitted in the north direction within the directional range of a width of P1. In addition, the second directional microphone 120-2 disposed in the robot 100 may obtain the audio signal transmitted in the east direction within the directional range of a width of P2. In addition, the third directional microphone 120-3 disposed in the robot 100 may obtain the audio signal transmitted in the south direction within the directional range of a width of P3. In addition, the fourth directional microphone 120-4 disposed in the robot 100 may obtain the audio signal transmitted in the west direction within the directional range of a width of P4. In this way, each of the four directional microphones may obtain the audio signals transmitted in the different directions.

While, the directional range of each directional microphone is shown to be the same in FIG. 3, embodiments of the present disclosure are not limited thereto. The plurality of directional microphones 120 may be set to different values not only in the orientation direction, but also in the directional range and angle.

In addition, FIG. 3 shows that the directing ranges of the respective directional microphones do not overlap each other. However, some portions in the directional ranges of the respective directional microphone may overlap each other based on the dislocation of the plurality of directional microphones 120 and the directional ranges (and directional angles) set in the directional microphones.

In addition, FIG. 3 shows that each of the plurality of directional microphones 120 is a single directional microphone. However, the directional microphone may be implemented as a bi-directional microphone, a super-directional microphone, or the like.

Hereinafter, for convenience of description of the present disclosure, the description describes that the robot 100 includes four single directional microphones (specifically, the first directional microphone 120-1, the second directional microphone 120-2, the third directional microphone 120-3, and the fourth directional microphone 120-4).

The processor 130 may control overall operations of the robot 100. Specifically, the processor 130 may control hardware or software components connected to the processor 130 by driving an operating system or an application program, and may perform various data processing and operations. In addition, the processor 130 may load and process instructions or data received from at least one of other components into a volatile memory, and store various data in a non-volatile memory. To this end, the processor 130 may include a central processing unit (CPU) or an application processor 130 (or application processor (AP)).

Figure 4:
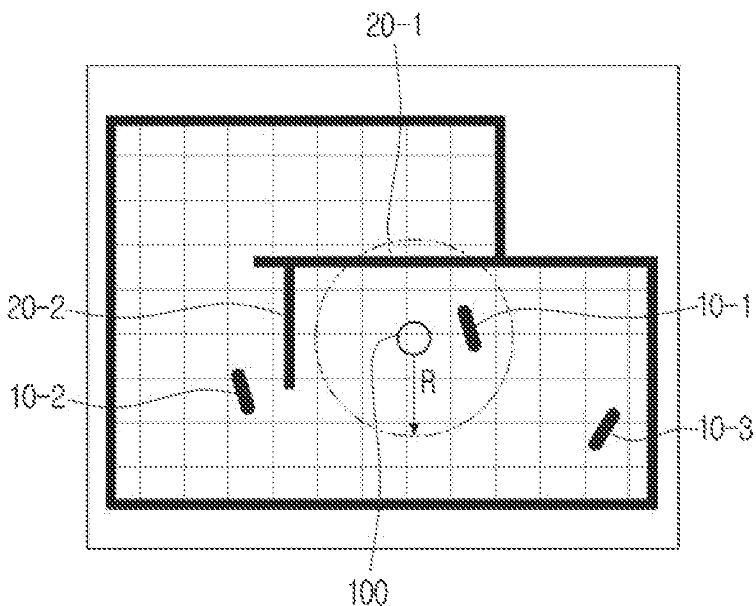
FIG. 4 is an exemplary diagram illustrating that information on a surrounding environment of the robot is obtained through a LiDAR sensor according to an embodiment of the present disclosure.

FIG. 4 is an exemplary diagram illustrating that information on the surrounding environment of the robot is obtained through the LiDAR sensor according to an embodiment of the present disclosure.

According to an embodiment of the present disclosure, the processor 130 may identify the objects around the robot 100 based on the sensing data obtained through the LiDAR sensor 110.

First, the processor 130 may identify whether an object exists around the robot 100 through the LiDAR sensor 110. Specifically, when receiving the laser which is irradiated from the LiDAR sensor 110 and then reflected from an object, the processor 130 may detect an object based on a time taken from the irradiation to reception of the laser.

Specifically, the processor 130 may identify a location where the laser is reflected based on the elapsed time between irradiation to reception of the reflected laser. The location where the laser is reflected may be identified as a point having a coordinate value corresponding to a location in a two-dimensional (or three-dimensional) coordinate space.

As the plurality of lasers are irradiated from the LiDAR sensor 110, the processor 130 may identify the point corresponding to the location where each laser is reflected in the two-dimensional (or three-dimensional) coordinate space. In addition, the processor 130 may identify the identified set of the plurality of points as a point cloud corresponding to an object. That is, as the laser irradiated from the LiDAR sensor 110 is reflected, the point cloud may be a set of clustered points identified on a surface of an object.

When identifying the point cloud in the two-dimensional (or three-dimensional) coordinate space, the processor 130 may identify that an object corresponding to the point cloud exists, and identify a distance between the identified object and the robot 100.

Here, the processor 130 may identify whether an object exists within a predetermined range around the robot 100. Specifically, referring to FIG. 4, the processor 130 may be set to identify only the objects within a radius of an R value around the robot 100.

When the time elapsed between irradiation and reception of the reflected laser is too long, the location where the laser is reflected may be located far from the robot 100. Accordingly, an error may exist in the reflected location identified based on the time taken by the robot 100 or the coordinate value of the point corresponding to the location. Accordingly, an error may also exist in the distance between the robot 100 and an object as well as the location of an object identified by the processor 130.

Accordingly, the processor 130 may identify whether an object exists only with the identified point cloud within the predetermined range from the robot 100. To this end, the processor 130 may identify the point corresponding to the location where the laser is reflected only when the elapsed time between the laser irradiating from the LiDAR sensor 110 to reception of the reflected laser through the LiDAR sensor 110 again is within a predetermined time.

Referring back to FIG. 4, the processor 130 may identify only a wall 20-1 located north of the robot 100 and an object 10-1 located east of the object as the objects around the robot 100. In addition, the processor 130 may not identify objects 10-2, 10-3, and 20-2 beyond the radius of the R value around the robot 100.

In an embodiment of the present disclosure, the processor 130 may identify the type of an object based on the sensing data obtained through the LiDAR sensor 110.

Specifically, the processor 130 may identify the type of an object around the robot 100 identified based on the sensing data. Various methods may be applied by the processor 130 to identify the type of an object based on the sensing data.

For example, the processor 130 may identify an amount of change in the distance between an object and the robot 100 based on the sensing data obtained through the LiDAR sensor 110. Here, the processor 130 may identify the amount of change in the distance between an object and the robot 100 in consideration of a moving speed of the robot 100 when the robot 100 is traveling.

In addition, the processor 130 may identify an object as a person when identifying that the object is moving or there is movement of the object based on the changed amount of the distance. On the other hand, when identifying an object as being fixed based on the amount of change in the distance, the processor 130 may identify the object as a thing such as an obstacle, a wall, or the like.

In addition, for example, the processor 130 may identify the type of an object based on the size, width, radius, and the like of the point cloud corresponding to the object. For example, when the LiDAR sensor 110 is implemented as the three-dimensional LiDAR sensor 110, the sensing data for an object obtained by the LiDAR sensor 110 may include not only information on the distance between the robot 100 and the object, but also information on a size of the object.

Here, the processor 130 may further identify the type of an object based on information on a height of the object. When identifying the size of an object is more than a predetermined size, the processor 130 may identify the object as the wall.

In addition, for example, the processor 130 may identify line data corresponding to an object having a line shape based on the distance information obtained using the LiDAR sensor 110, and identify the object based on the identified line data. Specifically, the processor 130 may extract straight linear component components with respect to the point cloud by using various line detection algorithms (e.g., Hough transform or HoughLines function). In addition, the processor 130 may identify that an object (specifically, the object corresponding to the point cloud) corresponding to the extracted linear component is the wall when the extracted linear component is equal to or greater than the predetermined size.

On the other hand, the processor 130 may identify that the object corresponding to the point cloud is not the wall when the linear component is not extracted or when the extracted linear component has a size less than the predetermined size. That is, for example, the processor 130 may identify the object corresponding to the point cloud as a person, an electronic device, furniture, and the like.

Alternatively, for example, the processor 130 may convert the two-dimensional (or three-dimensional) point cloud data into a two-dimensional (or three-dimensional) image and then input the converted two-dimensional (or three-dimensional) image to a deep learning model to recognize the type of an object. Here, the deep learning model that recognizes the type of an object may be the deep learning model using conventional clustering approaches.

In addition, according to an embodiment of the present disclosure, the robot 100 may further include a camera (e.g., depth camera), and the processor 130 may also identify the type of an object based on the image of the object obtained through the camera and the sensing data on the object obtained through the LiDAR sensor 110.

As such, the processor 130 may identify whether an object exists around the robot 100, the distance between the object and the robot 100, the type of the object, or the like by using the sensing data obtained through the LiDAR sensor 110 based on various object recognition methods.

In addition, according to an embodiment of the present disclosure, the processor 130 may identify a weight of the directional microphone corresponding to the location of the identified object among the plurality of directional microphones 120 based on the type of the identified object when identifying the object.

Specifically, the processor 130 may identify the type of an object, and then identify the weight of the directional microphone based on the type of the object included in each directional range of the plurality of directional microphones 120.

To this end, the processor 130 may identify an object around the robot 100 identified based on the sensing data. In addition, the processor 130 may identify an object included in the directional range and angle of each directional microphone among a plurality of objects. In addition, the processor 130 may identify the type of an object included in the directional range and angle of each directional microphone based on the sensing data. The method of identifying the type of an object is described above, and a detailed description thereof is thus omitted.

The processor 130 may identify the weight of the directional microphone corresponding to the directional range and directional angle in which each object is included, based on the identified object type.

For example, referring back to FIG. 3, assume that it is identified that an object A exists within the directional range and directional angle of the first directional microphone 120-1, and an object B exists within the directional range and directional angle of the second directional microphone 120-2. Here, the processor 130 may identify a type of the object A, and then identify a weight of the first directional microphone 120-1 based on the identified type of the object A. In addition, the processor 130 may identify a type of the object B, and then identify a weight of the second directional microphone 120-2 based on the identified type of the object B. As such, the processor 130 may identify the weight of each directional microphone based on the type of the object included in the directional range and directional angle of each directional microphone.

The weight of the directional microphone 120 may be a gain value applied to the audio signal obtained by the directional microphone 120. For example, assume that 2 is the identified weight of the first directional microphone 120-1. Here, the processor 130 may apply the weight to the audio signal obtained by the first directional microphone 120-1, and perform the identification by doubling the intensity of the audio signal obtained by the first directional microphone 120-1.

Hereinafter, the description describes an embodiment of the present disclosure in which weights of the plurality of directional microphones are identified based on the type of the object in detail with reference to FIGS. 5 to 7.

Figure 5:
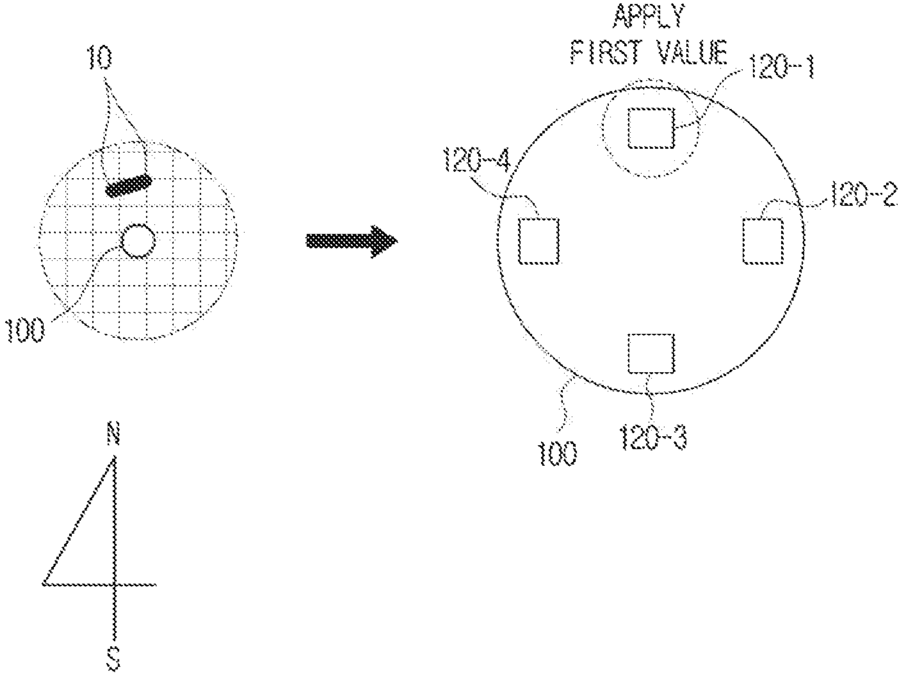
FIG. 5 is an exemplary diagram illustrating identification of a weight of the directional microphone when an object around the robot is identified as the person according to an embodiment of the present disclosure.

FIG. 5 is an exemplary diagram illustrating identification of a weight of a directional microphone when an object around the robot 100 is identified as a person according to an embodiment of the present disclosure. FIG. 6 is an exemplary diagram illustrating identification of a weight of a directional microphone when an object around the robot 100 is identified as a wall according to an embodiment of the present disclosure. FIG. 7 is an exemplary diagram illustrating identification of a weight of a directional microphone when objects around the robot 100 are identified as a person and a wall according to an embodiment of the present disclosure.

According to an embodiment of the present disclosure, when identifying an object as a person, the processor 130 may identify, as a first value, the weight of the directional microphone in a direction corresponding to the location of the object among the plurality of directional microphones 120.

Specifically, when identifying the type of an object identified based on sensing data as a person, the processor 130 may identify, as a first value, the weight of the directional microphone corresponding to the location of the object.

Specifically, the processor 130 may identify whether an object exists within the directional angle and range of each directional microphone based on the sensing data obtained through the LiDAR sensor 110. In addition, when identifying that an object exists, the processor 130 may identify the information on the distance between the object and the robot 100 included in the sensing data, the information on the point cloud corresponding to the object, or the type of the object based on whether the object identified by the sensing data is moving or the like.

In addition, when identifying the type of an object as a person, the processor 130 may identify the directional microphone corresponding to the location of the object. That is, the processor 130 may identify the directional microphone corresponding to the directional range that includes a point where the person is located. In addition, the processor 130 may identify the weight of the identified directional microphone as a first value. The processor may not identify weights of the remaining directional microphones other than that of the directional microphone identified as the first value, or may identify the weight as a reference value.

Referring to FIG. 5, assuming that the first value is 2 and the reference value is 1, the processor 130 may identify the first value of 2 to be the weight of the first directional microphone 120-1 corresponding to the location of the object identified as the person 10. Here, the processor 130 may identify the reference value of 1 to be the weight of each of the second to fourth directional microphones 120-2 to 120-4 corresponding to the remaining directional microphones. Accordingly, the processor 130 may receive the audio signal obtained through the first directional microphone 120-1 by amplifying the gain of the audio signal by a factor of two.

When identifying an object as a wall, the processor 130 may identify, as a second value, the weight of the directional microphone in the direction corresponding to the location of the object among the plurality of directional microphones.

Specifically, when identifying the type of an object as a wall, the processor 130 may identify a directional microphone corresponding to the location of the object and identify a second value as the weight of the identified microphone. Here, the processor 130 may identify, as a reference value, each weight of the remaining directional microphones other than that of the directional microphone identified as the second value.

Figure 6:
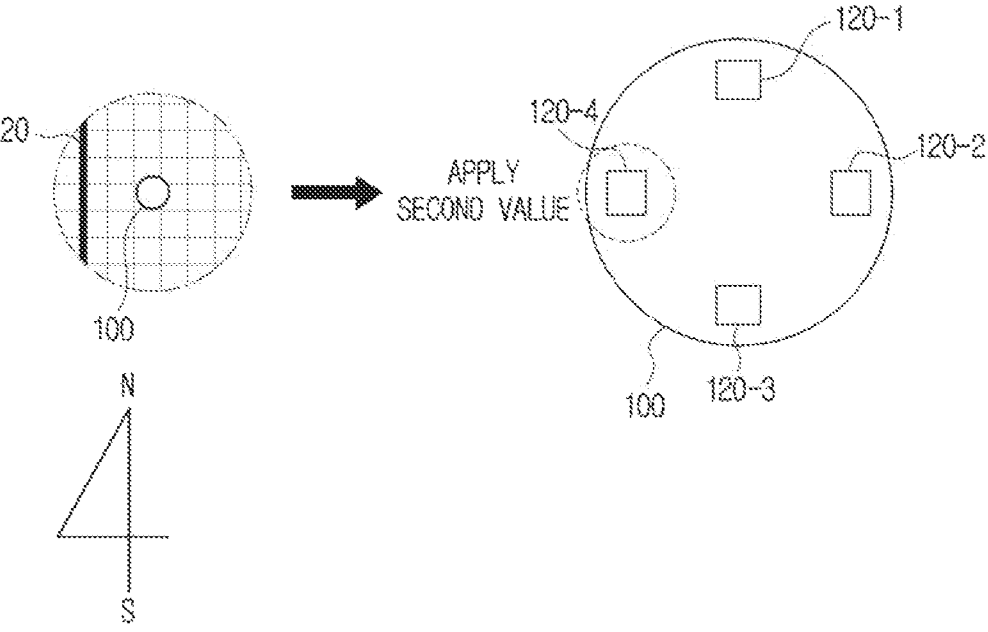
FIG. 6 is an exemplary diagram illustrating identification of a weight of the directional microphone when an object around the robot is identified as the wall according to an embodiment of the present disclosure.

Referring to FIG. 6, assuming that the second value is 0.5 and the reference value is 1, the processor 130 may identify the second value of 0.5 as the weight of the fourth directional microphone 120-4 corresponding to the location of the object identified as the wall 20. Here, the processor 130 may identify the reference value of 1 as the weight of each of the first to third directional microphones 120-1 to 120-3 corresponding to the remaining directional microphones. Accordingly, the processor 130 may receive the audio signal obtained through the fourth directional microphone 120-4 by reducing the gain of the audio signal by a factor of 0.5.

When identifying that a person and a wall simultaneously exist around the robot 100, the processor 130 may identify, as a first value and a second value, the weight of the directional microphone corresponding to the location of the respective objects identified as the person and the wall.

Specifically, the processor 130 may identify the directional microphone corresponding to the location of the object identified as the person among the plurality of directional microphones 120, and identify the directional microphone corresponding to the location of the object identified as the wall among the plurality of directional microphones 120. In addition, the processor 130 may identify, as a first value, the weight of the directional microphone corresponding to the location of the object identified as the person, and identify, as a second value, the weight of the directional microphone corresponding to the location of the object identified as the wall.

Figure 7:
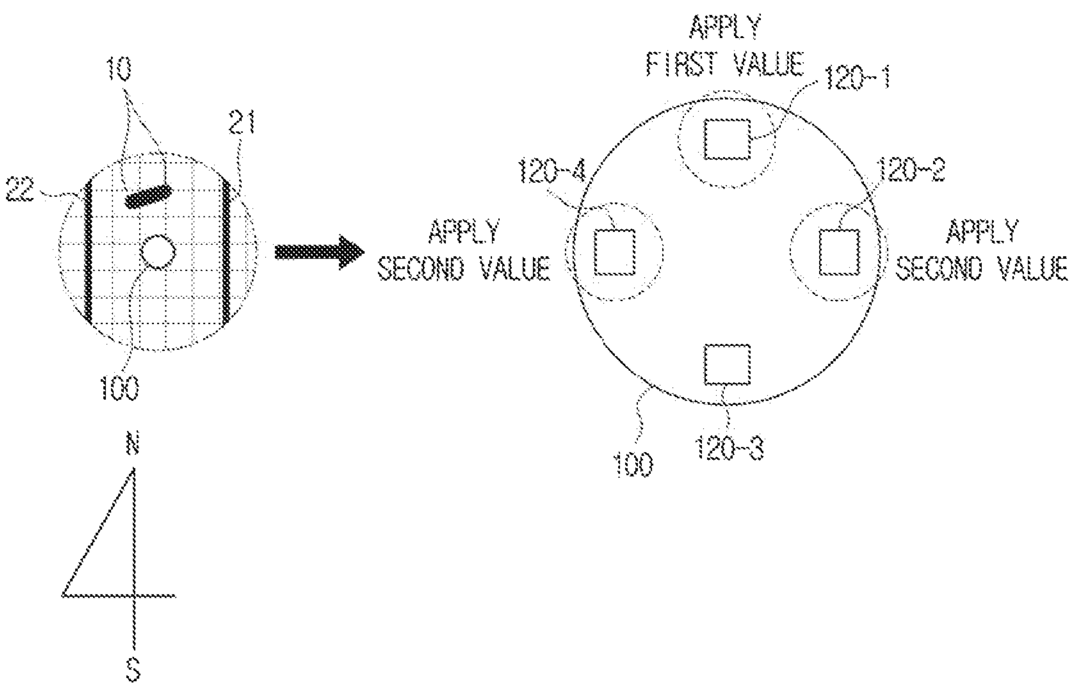
FIG. 7 is an exemplary diagram illustrating identification of a weight of the directional microphone when objects around the robot are identified as the person and the wall according to an embodiment of the present disclosure.

For example, referring to FIG. 7, the processor 130 may identify the first directional microphone 120-1 as the directional microphone corresponding to the location of the object identified as the person 10. In addition, the processor 130 may identify the second and fourth directional microphones 120-2 and 120-4 as the directional microphones corresponding to the locations of the objects identified as walls 21 and 22. In addition, the processor 130 may identify the weight of the first directional microphone 120-1 as the first value, and identify, as the second value, the weight of the directional microphones of the second and fourth directional microphones 120-2 and 120-4. The processor 130 may identify the weight of the remaining third directional microphone 120-3 as the reference value.

According to an embodiment of the present disclosure, the first value may be greater than the second value. Specifically, the processor 130 may predict that the audio signal on which the voice recognition is to be performed by the robot 100 is about to be output from the object identified as the person.

For example, the audio signal on which the voice recognition is to be performed by the robot 100 may include a voice including a wake-up word of the robot 100 or a command for controlling the robot 100, or the like, uttered by the person. On the other hand, when identifying the object as the wall, the processor 130 may predict the audio signal on which the voice recognition is to be performed by the robot 100 is not to be received from this direction.

Therefore, the processor 130 may apply the weight having a higher value to the directional microphone corresponding to the location of the object identified as the person, thereby increasing the gain value of the audio signal obtained through the corresponding directional microphone.

Here, according to an embodiment of the present disclosure, the processor 130 may apply the weight of the first value when the object identified as the person and the object identified as the wall simultaneously exist within the directional angle and range of simultaneously directional microphone.

Specifically, a plurality of objects may exist within the directional angle and range of a given directional microphone. In this situation, the processor 130 may identify the type of each of the plurality of objects based on the sensing data obtained through the LiDAR sensor 110. When identifying the type of each of the plurality of objects as a person and a wall, respectively, the processor 130 may identify, as the first value, the weight of the directional microphone corresponding to the location of the plurality of objects.

For example, referring back to FIG. 3, assume that three objects exist within the directional angle and range of the third directional microphone 120-3 among the plurality of directional microphones. In addition, assume that two of the three objects are each identified as the person and the other one is identified as the wall. Here, the processor 130 may identify the weight of the third directional microphone 120-3 as the first value rather than the second value. The reason is that the processor 130 identifies that two persons exist along with the wall in the direction corresponding to the third directional microphone 120-3 although identifying the wall exists in the corresponding direction, and thus may predict that a verbal utterance or the like is about to be received in the direction corresponding to the third directional microphone 120-3.

According to an embodiment of the present disclosure, the processor 130 may identify the weights of the plurality of directional microphones based on a driving state of the robot 100.

Specifically, when identifying that the robot 100 is traveling, the processor 130 may identify the weight of the directional microphone corresponding to a traveling direction of the robot 100 and the weight of the directional microphone corresponding to a direction opposite to the traveling direction, respectively.

Here, the directional microphone corresponding to the traveling direction may refer to the directional microphone disposed in a direction coincident with the traveling direction among the directional microphones which are disposed in the robot 100 while being separated from each other. For example, referring back to FIG. 3, when the robot 100 is traveling to the east, the second directional microphone 120-2 may be the directional microphone corresponding to the traveling direction of the robot 100.

According to an embodiment of the present disclosure, the processor 130 may identify, as a third value, the weight of the directional microphone corresponding to the traveling direction of the robot 100, and identify, as a fourth value, the weight of the directional microphone corresponding to the direction opposite to the traveling direction of the robot 100.

Here, the fourth value may be greater than the third value. This configuration applies a greater weight value to the audio signal received in the direction opposite to the traveling direction of the robot 100 that corresponds to a direction relatively distant from the robot 100. As the robot 100 travels, a distance between the robot 100 and the user located in the opposite direction to the traveling direction of the robot 100 may be increased. Here, even though the user verbally utters a control command for the robot 100, the robot 100 may obtain the user voice despite it having a smaller sound. As a result, the robot may not properly perform the voice recognition for the received user voice. Therefore, the processor 130 may obtain a clearer audio signal by increasing the intensity of the audio signal that may be received in the direction opposite to the traveling direction of the robot 100.

FIG. 8 is a diagram illustrating a method of identifying the pre-processing model based on context information of the robot according to an embodiment of the present disclosure.

According to an embodiment of the present disclosure, the processor 130 may obtain the context information of the robot 100 based on the sensing data, and identify a pre-processing model 30 corresponding to each of the plurality of directional microphones 120 based on the context information.

Specifically, the processor 130 may identify the weights of the plurality of directional microphones 120 and then identify the pre-processing model 30 to be applied to the audio signals received through the plurality of directional microphones 120. Here, the processor 130 may identify the pre-processing model to pre-process the audio signals received through the plurality of directional microphones 120 in consideration of the surrounding environment of the robot 100.

To this end, the processor 130 may obtain the context information of the robot 100 based on the sensing data. The context information may be information for the robot 100 to identify its surrounding environment, and may include information on the objects around the robot 100, spatial information regarding where the robot 100 is located, and information on the driving state of the robot 100.

For example, the context information may include information indicating whether a space where the robot 100 is located is an enclosed space, whether the robot 100 is located in a narrow passage, whether many people exist around the robot 100, whether the robot 100 is traveling, or the like.

The pre-processing model 30 may include a deep learning model trained to remove noise in the audio signal obtained by the directional microphone, restore a distorted audio signal, or restore lost information in the audio signal. For example, the pre-processing model 30 may include a deep noise auto encoder which is unsupervised trained to remove noise in the audio signal obtained by the robot 100 or restore the lost information based on the environment of the robot 100.

More specifically, a memory of the robot 100 may store the plurality of pre-processing models 30 trained based on the respective environments in which the robot 100 is located such as the driving state of the robot 100, the type of the objects around the robot 100, or the distance between the robot 100 and the objects. The processor 130 may identify the surrounding environment of the robot 100 with the context information obtained based on the sensing data, and then obtain from the memory the pre-processing model 30 corresponding to the identified environment.

Referring to FIG. 8, the memory of the robot 100 may store, as a table, information on the plurality of pre-processing models corresponding to the respective environments. Here, the processor 130 may identify whether the space where the robot 100 is located is an enclosed space or an open space based on the sensing data. In addition, the processor 130 may identify whether an object exists around the robot 100, the number of objects, the type of objects, the location of the objects, the distance between the objects and the robot 100, and the like, based on information on the sensing data. In addition, the processor 130 may also identify the driving state of the robot 100, that is, whether the robot is traveling or stationary based on the sensing data.

In addition, the processor 130 may identify the context information of the robot 100 by combining information on the space, the object, and the driving state of the robot 100, identified based on the sensing data. For example, the processor 130 may obtain first context information of the robot 100 as a condition that one object identified as a person exists in the first direction of the robot 100 currently traveling in the open space. Here, the processor 130 may identify a pre-processing model A as that pre-processing model corresponding to the first context information. Here, the pre-processing model A may be a deep learning model trained to pre-process the audio signal obtained by the robot 100 through the microphone when one object identified as a person exists in the first direction of the robot 100 traveling in the open space.

In this way, the processor 130 may obtain the context information, identify the environment and state of the robot 100 based on the obtained context information, and identify the pre-processing model 30 suitable for the environment and identification of the identified robot 100.

The first context information according to an embodiment of the present disclosure may include information on the type of an object, information on the location of an object, information on the number of objects, and information on the distance between the robot 100 and the objects. In addition, second context information may include information on whether the robot 100 is traveling, information on a traveling speed of the robot 100, and information on the traveling direction of the robot 100.

Specifically, the first context information may be the context information on the space around the robot 100 and the objects existing around the robot, and the second context information may be the context information on the robot 100. Here, the processor 130 may obtain the first context information on the space around the robot 100 and the second context information on the driving state of the robot 100, based on the sensing data, and identify the pre-processing model corresponding to each directional microphone based on at least one of the obtained first and second context information.

The pre-processing model 30 applied to each audio signal received through each directional microphone may depend on the context information. For example, assuming that the robot 100 includes four directional microphones, in the case of the first context information, the same pre-processing model A may be applied to the four audio signals received through the four directional microphones, and on the other hand, in the case of the second context information, a pre-processing model B may be applied to two audio signals received through two of the four directional microphones, and a pre-processing model C may be applied to two audio signals received through the remaining two directional microphones. In this way, the pre-processing model applied to each directional microphone may also depend on the surrounding environment of the robot.

Although the pre-processing model is described as being stored in the memory of the robot 100, the processor 130 may obtain the pre-processing model corresponding to the context information from a server. Specifically, when the processor 130 transmits the context information of the robot 100 to the server through a communication interface, the server may identify the pre-processing model 30 corresponding to the received context information and send the same to the processor 130. In addition, the processor 130 may receive the pre-processing model 30 transmitted by the server through the communication interface.

The processor 130 may identify the pre-processing model 30 corresponding to the plurality of directional microphones 120, and then apply the identified weight to the audio signal received through the directional microphone corresponding to the location of the identified object among the plurality of audio signals received through the plurality of directional microphones 120.

Specifically, the processor 130 may obtain the plurality of audio signals through the plurality of directional microphones 120. Here, as described above, each directional microphone may obtain the audio signal received from the directional direction of each directional microphone. In addition, the processor 130 may apply each identified weight of each directional microphone to the audio signal obtained through each directional microphone.

For example, assume that 3 is the identified weight of the first directional microphone 120-1, 0.5 is the identified weight of the second directional microphone 120-2, and there is no identified weight of the third directional microphone 120-3 or the fourth directional microphone 120-4. Here, the processor 130 may apply the identified weight of 3 to a first audio signal obtained through the first directional microphone 120-1 to triple the intensity (e.g., amplitude) of the first audio signal. On the other hand, the processor may apply the identified weight of 0.5 to a second audio signal obtained through the second directional microphone 120-2 to reduce the intensity (e.g., amplitude) of the second audio signal by 0.5 times. In addition, the processor 130 may not apply a weight to a third audio signal obtained through the third directional microphone 120-3 and a fourth audio signal obtained through the fourth directional microphone 120-4. In addition, the processor 130 may obtain the plurality of pre-processed audio signals by inputting the audio signal to which the weight is applied and the remaining audio signal to which no weight is applied, respectively, to the pre-processing model set for each directional microphone.

Specifically, the processor 130 may input, to the pre-processing model identified as corresponding to each directional microphone, the audio signal having an intensity different from the intensity identified at a time the audio signal is received through the microphone because the weight is applied thereto, and the audio signal having the same intensity as the intensity identified at the time the audio signal is received through the microphone because no weight is applied thereto. Here, the pre-processing models identified as corresponding to the plurality of directional microphones 120 as described above may be the same or different from each other based on the environment of the robot 100.

For the above example, in other words, with respect to the first directional microphone 120-1, the processor 130 may input the audio signal having intensity three times that of the first audio signal received through the first directional microphone 120-1 to the pre-processing model identified as corresponding to the first directional microphone 120-1. The processor 130 may then obtain a first pre-processed audio signal corresponding to the first audio signal. On the other hand, with respect to the second directional microphone 120-2, the processor 130 converts an audio signal having intensity 0.5 times that of the first audio signal received through the second directional microphone 120-2 into the second directional microphone 120-2 with respect to the second directional microphone 120-2, the processor 130 may input the audio signal having intensity 0.5 times that of the first audio signal received through the second directional microphone 120-2 to the pre-processing model identified as corresponding to the second directional microphone 120-2. The processor 130 may then obtain a second pre-processed audio signal corresponding to the second audio signal. In addition, the processor 130 may obtain third and fourth pre-processed audio signals by inputting the third and fourth audio signals received through the third and fourth directional microphones 120-3 and 120-4, respectively, as they are to the pre-processing models identified respectively corresponding to the third and fourth directional microphones 120-3 and 120-4.

As such, in the plurality of audio signals obtained through the plurality of directional microphones 120, the intensity of the audio signal may depend on whether the object exists within the directional angle and directional range of each directional microphone or the type of the object, and a type of the pre-processing model to which each audio signal is input may also depend on the environment of the robot 100. In this way, the processor 130 may obtain a refined and optimal audio signal for performing the voice processing based on the surrounding environment of the robot.

The processor 130 may obtain the plurality of pre-processed audio signals, and then perform the voice recognition based on the obtained plurality of pre-processed audio signals.

Specifically, the processor 130 may extract the obtained plurality of audio signals or feature information (feature vector) from the plurality of audio signals. In addition, the processor 130 may obtain information on the voice recognition corresponding to the feature information based on an acoustic model and a language model.

Here, the information on the voice recognition may include pronunciation information, phoneme information, and character string information corresponding to the feature information obtained based on the acoustic model, and text data corresponding to the obtained pronunciation information based on the language model.

To this end, the memory of the robot 100 may include a speech to text (STT) model, an automatic speech recognition (ASR) model, a natural language understanding (NLU) model, or the like.

Here, the ASR model may include an acoustic model (AM), a pronunciation model (PM), and a language model (LM). The AM may extract an acoustic feature of the received user voice and obtain a phoneme sequence. In addition, the PM may include a pronunciation dictionary (or pronunciation lexicon), and obtain a word sequence by mapping the obtained phoneme sequence to a word. In addition, LM may assign a probability to the obtained word sequence. That is, the ASR model may obtain the text corresponding to the user voice through an artificial intelligence model such as the AM, the PM or the LM.

The ASR model may include an end-to-end voice recognition model in which components of the AM, the PM and the LM are combined to each other into a single neural network.

In addition, the processor 130 may identify the location where the voice is uttered, that is, the location of the sound source, by using the plurality of pre-processed audio signals.

Specifically, the processor 130 may identify a time delay of the audio signal received through each of the plurality of directional microphones 120, and set the time delay for a plurality of specific locations around the robot based on the identified time delay of each directional microphone 120. That is, when receiving the audio signal output from the specific location (or distance), the processor 130 may set the time delay of the audio signal received from each directional microphone 120 to correspond to the specific location (or distance).

When receiving the audio signal through the plurality of directional microphones 120, the processor 130 may identify at least one candidate location within the predetermined range around the robot 100. Here, the candidate location may be the specific location assumed to output the audio signal received by the robot among the plurality of specific locations around the robot 100. In addition, the processor 130 may obtain beamforming output power by applying the time delay set for the identified candidate location to the audio signals received through the plurality of directional microphones 120, and synthesizing the audio signals with each other.

That is, the processor 130 may obtain one audio signal by moving the plurality of audio signals by a predetermined time delay (frequency, or the like) with respect to the candidate location and then synthesizing the plurality of delayed audio signals with each other. In addition, the processor 130 may calculate the beamforming output power for one obtained audio signal. As such, for the plurality of candidate locations, the processor 130 may obtain the beamforming output power based on the time delay set for each candidate location. In addition, the processor 130 may identify the candidate location where the beamforming output power is maximized as a location of the sound source. The processor 130 may use a steered response power with the phase transform (SRP-PHAT) algorithm to identify the location of the sound source.

The predetermined time delay for the candidate location may be a value set in consideration of the direction in which the plurality of directional microphones 120 are disposed and the distance between the plurality of directional microphones 120 to calculate the highest beamforming power for an exact location of the actual sound source.

The processor 130 may use a sub-space estimation method, a time delay estimation method or the like to identify the location of the sound source.

Hereinafter, are described each type of the pre-processing models applied to the plurality of directional microphones based on the surrounding environment of the robot 100 and an embodiment of the present disclosure related thereto.

FIG. 9 is an exemplary diagram illustrating the identification of the pre-processing model applied to the plurality of directional microphones when the robot is identified as traveling according to an embodiment of the present disclosure.

FIG. 10 is an exemplary diagram illustrating the identification of the pre-processing model applied to the plurality of directional microphones when the robot is identified as traveling toward the person according to an embodiment of the present disclosure.

According to an embodiment of the present disclosure, when the processor 130 identifies that the robot 100 is traveling based on the second context information, the pre-processing model corresponding to the plurality of directional microphones may include a first model.

The processor 130 may identify that the robot 100 is traveling based on the second context information on the driving state of the robot 100. Specifically, the processor 130 may detect a change in the relative distance between the robot 100 and objects around the robot 100 based on the sensing data obtained through the LiDAR sensor 110. The processor 130 may identify whether the robot 100 is traveling and the traveling direction of the robot 100 through the change in the relative distance between the detected robot 100 and the objects around the robot 100.

When the robot 100 is traveling, noise may occur due to frictional noise occurring from contact between the robot 100 and the ground, road or the like where the robot 100 is located.

A first model 30-1 according to an embodiment of the present disclosure may be the pre-processing model trained to remove or reduce noise occurring from a road or the like while the robot 100 is traveling. To this end, the first model 30-1 may be learned in advance by the robot 100 through first audio data including noise and second audio data including no noise.

When identifying that the robot 100 is traveling based on the sensing data, the processor 130 may identify that the pre-processing model for the plurality of directional microphones 120 is the pre-processing model including the first model 30-1.

Specifically, the processor 130 may equally input the plurality of audio signals obtained through the plurality of directional microphones to the pre-processing model including the first model 30-1. In addition, the processor 130 may obtain the plurality of pre-processed audio signals respectively corresponding to the audio signals as output data of the pre-processing model including the first model 30-1.

For example, referring to FIGS. 3 and 9, the processor 130 may identify that the robot 100 is traveling in the north direction based on the obtained sensing data. Here, the processor 130 may input all of the first to fourth audio signals obtained from the first to fourth directional microphones 120-1 to 120-4 into the pre-processing model including the first model 30-1. In addition, the processor 130 may obtain the plurality of pre-processed audio signals respectively corresponding to the first to fourth audio signals as the output data of the pre-processing model including the first model 30-1.

The size and waveform of noise occurring between the robot 100 and the ground may depend on the traveling speed of the robot 100. Accordingly, according to an embodiment of the present disclosure, the first model 30-1 may include the plurality of pre-processing models corresponding to a plurality of levels classified based on the traveling speed of the robot 100. That is, the first model 30-1 may include a plurality of first pre-processing models trained to remove noise occurring differently based on the traveling speed of the robot 100.

To this end, the plurality of levels may be set based on a predetermined range of the traveling speed. For example, a first level may be set to the traveling speed of the robot 100 which is zero km/h or more and less than 1 km/h, a second level may be set to the traveling speed of 1 km/h or more and less than 2 km/h, and a third level may be set to the traveling speed of 2 km/h or more and less than 3 km/h. In addition, the first model may include the plurality of pre-processing models (e.g., 1-1-th model corresponding to the first level, 1-2-th model corresponding to the second level, and 1-3-th model corresponding to the third level) trained to remove noise occurring between the ground and the robot 100 that occurs at the traveling speed corresponding to each level.

Accordingly, when identifying that the robot 100 is traveling, the processor 130 may identify the traveling speed of the robot 100, and then identify a level corresponding to the traveling speed of the robot 100. In addition, the processor 130 may apply the pre-processing model including the first model corresponding to the identified traveling speed to the plurality of directional microphones.

In addition, according to an embodiment of the present disclosure, when identifying that the robot 100 is traveling toward an object identified as a person based on the first and second context information, the processor 130 may identify the pre-processing model including the first model 30-1 and the second model 30-2 as the pre-processing model corresponding to the directional microphone in the direction corresponding to the location of the object.

The second model 30-2 according to an embodiment of the present disclosure may be the pre-processing model trained to prevent the audio signal output from the sound source from being distorted due to the change in the distance between the traveling robot 100 and the sound source outputting the audio signal, or to restore the lost information in the audio signal. To this end, the second model 30-2 may be trained in advance through third audio data obtained while the robot 100 is moving and fourth audio data obtained while the robot 100 is stationary for the same text.

The processor 130 may identify that the robot 100 is traveling based on the second context information, and identify that the robot 100 is traveling toward an object identified as a person based on the first and second context information.

Specifically, the processor 130 may obtain, through the LiDAR sensor 110 in real time, the sensing data on the surrounding environment of the robot 100 that is changed as the robot 100 travels. Here, the processor 130 may identify that an object exists within the directional angle and range of the directional microphone corresponding to the direction in which the robot 100 travels based on the sensing data obtained through the LiDAR sensor 110. In addition, when identifying that the type of object is a person based on the sensing data, the processor 130 may identify that the robot 100 is traveling toward the person.

Alternatively, the processor 130 may identify the objects around the robot 100 while the robot 100 is stationary based on the first context information. Here, when the robot 100 starts the traveling based on a received traveling command, the processor 130 may identify the traveling direction of the robot 100 based on the second context information. In addition, the processor 130 may identify that the robot 100 is traveling toward an object identified as a person when identifying that the traveling direction of the robot 100 corresponds to the location of the object identified as the person based on the first and second context information.

In this way, when identifying that the robot 100 is traveling toward an object identified as a person based on the first and second context information, the processor 130 may identify the pre-processing model including the first model 30-1 and the second model 30-2 as the pre-processing model corresponding to the directional microphone in the direction corresponding to the location of the object.

That is, the processor 130 may connect the second model trained to restore the distortion of the audio signal that occurs due to the change in the distance between the robot 100 and the person to the first model 30-1 applied when the robot 100 is identified as traveling.

Here, according to an embodiment of the present disclosure, the processor 130 may apply the weight of the first value to the audio signal received through the directional microphone in the direction corresponding to the location of the object identified as the person, obtain the first pre-processed audio signal by inputting the audio signal to which the weight of the first value is applied to the first model 30-1, and obtain the second pre-processed audio signal by inputting the obtained first pre-processed audio signal to the second model 30-2. In addition, the processor 130 may apply no weight to the audio signal (or apply a reference weight thereto), the audio signal being received through the remaining directional microphones except for the directional microphone to which the weight of the first value is applied among the plurality of directional microphones, and obtain the pre-processed audio signals for each audio signal by inputting the received audio signal to the first model 30-1.

Referring to FIG. 10, the processor 130 may identify that the robot 100 is traveling in the north direction based on the obtained second context information. Here, the processor 130 may identify the pre-processing model corresponding to the first to fourth microphones 120-1 to 120-4 as the pre-processing model including the first model 30-1. In addition, the processor 130 may identify that the robot 100 is traveling toward an object identified as a person based on the first and second context information. Here, the processor 130 may identify that the pre-processing model further includes the second model 30-2, the pre-processing model corresponding to the first directional microphone 120-1 corresponding to the directional microphone in the north direction corresponding to the location of the object 10 identified as the person. Accordingly, the processor 130 may apply the weight of the first value to the first audio signal obtained through the first directional microphone 120-1, obtain the first pre-processed audio signal by inputting the first audio signal to which the weight of the first value is applied to the first model 30-1, and obtain the second pre-processed audio signal by inputting the obtained first pre-processed audio signal to the second model 30-2. The processor 130 may apply no weight to the second to fourth audio signals obtained through the second to fourth directional microphones 120-2 to 120-4, and obtain each pre-processed audio signal by inputting the second to fourth audio signals to the first model 30-1.

In addition, according to an embodiment of the present disclosure, when identifying that the robot 100 is adjacent to an object identified as a wall based on the first context information, the processor 130 may identify the pre-processing model including a third model 30-3 as the pre-processing model corresponding to the plurality of directional microphones. That is, when identifying that the robot 100 is located in an enclosed space surrounded by walls or traveling through a narrow passage, the processor 130 may identify the pre-processing model including the third model as the pre-processing model corresponding to the plurality of directional microphones 120 of the robot 100.

Here, the third model 30-3 may be a deep learning-based pre-processing model trained to remove the audio signal reflected from the wall, that is, echo noise. Specifically, the third model 30-3 may be a model trained to remove the echo noise included in the audio signal obtained through the directional microphone. To this end, the third model 30-3 may be trained in advance using fifth audio data including no echo noise and sixth audio data including the echo noise for the plurality of texts.

Specifically, the processor 130 may identify the distance between an object identified as a wall around the robot 100 and the robot 100 based on the first context information. In addition, when identifying the distance between the object identified as the wall and the robot 100 is within a predetermined distance, the processor 130 may identify that the robot 100 and the object identified as the wall are adjacent to each other.

In an embodiment of the present disclosure, the processor 130 may identify that the robot 100 is adjacent to the object identified as the wall based on the line data corresponding to the object. Specifically, the processor 130 may identify that the object is a wall when identifying a size of the line data corresponding to the object is the predetermined size or more. Here, the processor 130 may identify that the robot 100 is adjacent to a wall when identifying that the plurality of line data corresponding to the object identified as a wall intersects with each other, and a distance of the robot 100 from the intersection of the line data is within the predetermined distance. Alternatively, the processor 130 may also identify that the robot 100 is adjacent to a wall when identifying a minimum distance between the robot 100 and each line data, and the identified minimum distances are all within the predetermined distance.

In this way, when identifying that the robot 100 is traveling adjacent to an object identified as a wall, the processor 130 may identify the pre-processing model corresponding to the plurality of directional microphones as the pre-processing model including the third model 30-3. In this way, the processor 130 may obtain the pre-processed audio signal from which the echo noise is removed from the received audio signal.

Figure 11:
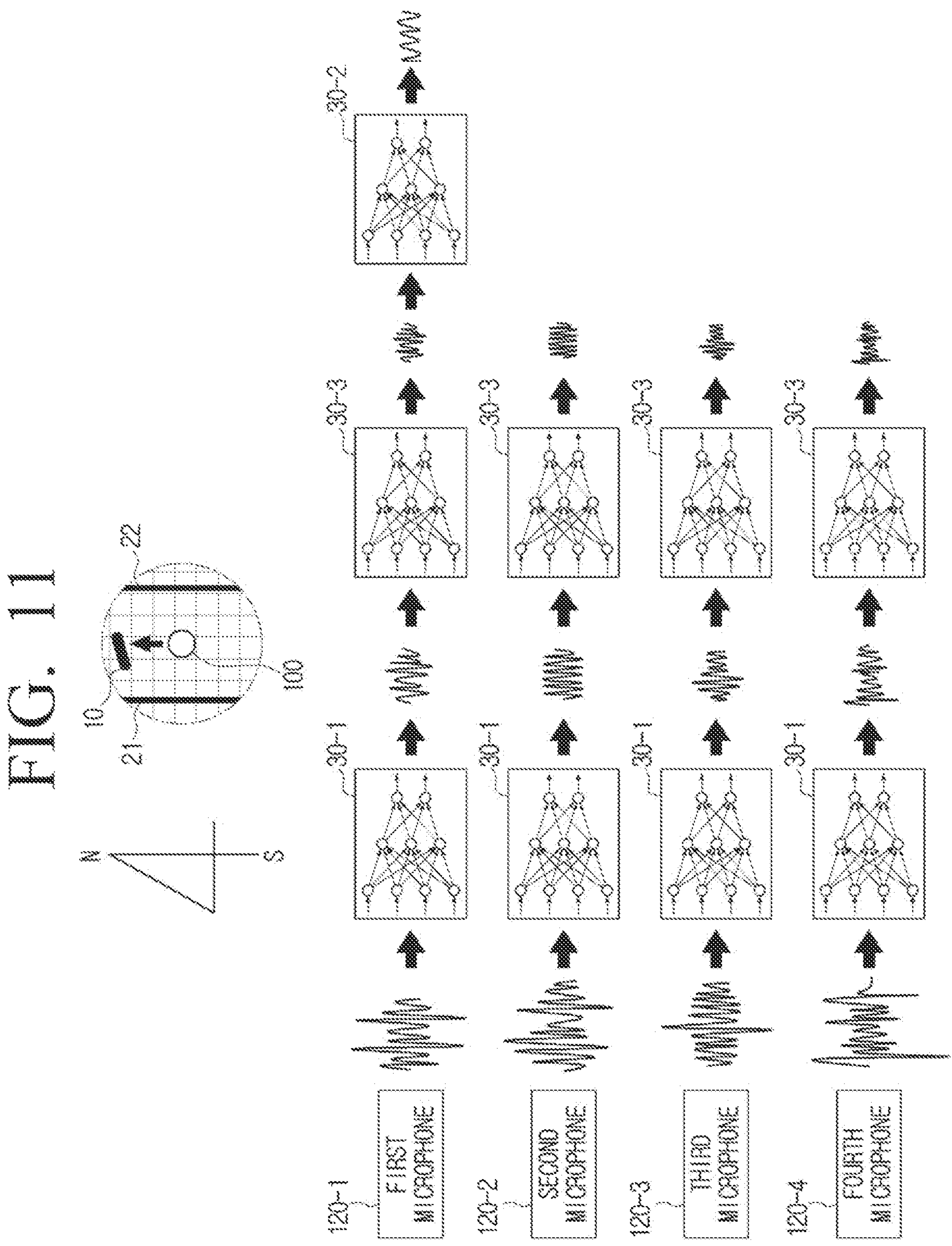
FIG. 11 is an exemplary diagram illustrating a pre-processing model applied to the plurality of directional microphones when a robot is identified as traveling toward the person adjacent to the wall according to an embodiment of the present disclosure.

FIG. 11 is an exemplary diagram illustrating a pre-processing model applied to the plurality of directional microphones when the robot is identified as traveling toward a person adjacent to a wall according to an embodiment of the present disclosure.

According to an embodiment of the present disclosure, when identifying that the robot 100 is traveling toward an object identified as a wall based on the first and second context information, the processor 130 may identify the pre-processing model including the first model 30-1, the second model 30-2, and the third model 30-3 as the pre-processing model corresponding to the directional microphone in the direction corresponding to the location of the object.

Here, according to an embodiment of the present disclosure, the processor 130 may apply the weight of the first value to the audio signal received through the directional microphone in the direction corresponding to the location of an object identified as a person, and apply the weight of the second value to the audio signal received through the directional microphone in the direction corresponding to the location of the object identified as a wall.

In addition, the processor 130 may obtain the first pre-processed audio signal by inputting the audio signal to which the weight of the first value is applied to the first model 30-1, obtain the second pre-processed audio signal by inputting the obtained first pre-processed audio signal to the second model 30-2, and obtain a third pre-processed audio signal by inputting the obtained second pre-processed audio signal to the third model 30-3.

In addition, the processor 130 may obtain a fourth pre-processed audio signal by inputting the audio signal to which the weight of the second value is applied to the first model 30-1, and obtain a fifth pre-processed signal by inputting the obtained fourth pre-processed audio signal to the third model 30-3.

Here, the processor 130 may obtain a sixth pre-processed audio signal by inputting the remaining audio signals to which the weight of the first value or the second value is not applied to the first model 30-1, and obtain a seventh pre-processed signal by inputting the obtained sixth pre-processed audio signal to the third model 30-3.

The description describes that the pre-processing models to which the audio signals are input in an order of the first to the third models, but embodiments of the present disclosure are not limited thereto. That is, the order of the first to third models may vary depending on a given embodiment.

Specifically, referring to FIG. 11, the processor 130 may identify that the robot 100 is traveling adjacent to a wall based on the first and second context information. In addition, the processor 130 may identify that the pre-processing model corresponding to the first to fourth microphones 120-1 to 120-4 further includes the third model 30-3. Accordingly, the processor 130 may apply the weight of the first value to the first audio signal obtained through the first directional microphone 120-1, obtain a 1-1-th pre-processed audio signal by inputting the first audio signal to which the weight of the first value is applied to the first model 30-1, obtain a 1-2-th pre-processed audio signal by inputting the obtained 1-1-th pre-processed audio signal to the third model 30-3, and obtain a 1-3-th pre-processed audio signal by inputting the obtained 1-2-th pre-processed audio signal to the second model 30-2.

The processor 130 may apply the weight of the second value to the second and fourth audio signals obtained through the second and fourth directional microphones 120-2 and 120-4 in the direction corresponding to the location of the object identified as the wall. In addition, the processor 130 may obtain 2-1-th and 4-1-th pre-processed audio signals which are respectively pre-processed by inputting the second and fourth audio signals to which the weight of the second value is applied to the first model 30-1. In addition, the processor 130 may obtain each of 2-2-th and 4-2-th pre-processed audio signals by inputting the 2-1-th and 4-1-th pre-processed audio signals to the third model 30-3.

In addition, the processor 130 may apply no weight to the third audio signal obtained through the third directional microphone 120-3, and obtain a 3-1-th pre-processed audio signal by inputting the third audio signal to the first model 30-1. In addition, the processor 130 may obtain a 3-2-th preprocessed audio signal by inputting the 3-1-th preprocessed audio signal to the third model 30-3-th.

According to an embodiment of the present disclosure, when identifying that the plurality of objects identified as people exist around the robot 100 based on the first context information, the processor 130 may identify the pre-processing model including a fourth model as the pre-processing model corresponding to the plurality of directional microphones.

The fourth model may be a deep learning-based pre-processing model trained to remove babble noise. Specifically, the fourth model may be model trained to remove non-stationary type noise such as the babble noise such as hum included in the audio signal obtained through the directional microphone when the objects are identified as many people. To this end, the fourth model may be trained in advance through seventh audio data including no noise and eighth audio data including the babble noise for the plurality of texts.

The processor 130 may identify the information on the space around the robot 100 through the first context information. Specifically, when identifying a plurality of objects around the robot 100 and the plurality of objects are people, the processor 130 may identify the fourth model as the pre-processing model. Here, the processor 130 may identify the fourth model as the pre-processing model corresponding to the plurality of directional microphones. That is, the processor 130 may equally apply the fourth model to the plurality of audio signals obtained through the plurality of directional microphones.

However, according to the embodiment of the present disclosure, when the distance between the robot 100 and the objects identified as people is more than the predetermined distance, the processor 130 may apply the fourth model only to the directional microphone in the direction corresponding to the locations of the objects identified as people among the plurality of directional microphones. Specifically, the processor 130 may perform clustering on the plurality of objects identified as people by using the sensing data. In addition, the processor 130 may identify the distance between a group including the plurality of clustered objects and the robot 100.

Here, the processor 130 may identify the distance between each object included in the group and the robot 100 based on the sensing data, and then calculate an average value of the identified distance. In addition, when comparing the calculated average value with the predetermined distance and then identifying that the calculated average value is the predetermined distance or more, the processor 130 may identify, as the fourth model, the pre-processing model for the directional microphone in the direction corresponding to the location of the group including the plurality of objects among the plurality of directional microphones.

Figure 12:
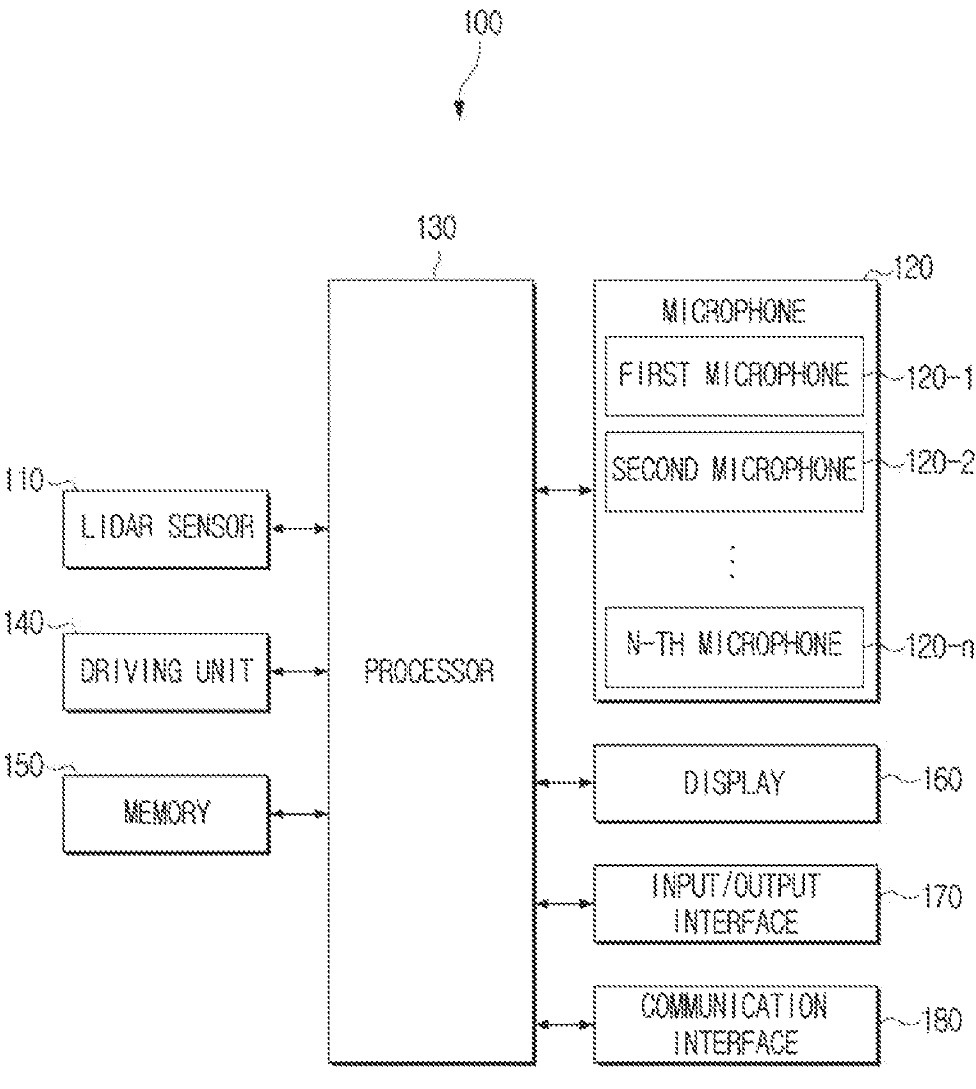
FIG. 12 is a detailed configuration diagram of the robot according to an embodiment of the present disclosure.

FIG. 12 is a detailed configuration diagram of the robot according to an embodiment of the present disclosure.

Referring to FIG. 12, according to an embodiment of the present disclosure, the robot 100 may include the LiDAR sensor 110, the plurality of directional microphones 120, a driving unit 140, a memory 150, and a display 160, an input/output interface 170, a communication interface 180, and the processor 130. The description omits a detailed description for components overlapping components illustrated in FIG. 2 among components illustrated in FIG. 11.

The driving unit 140 is a component for moving the robot 100. The driving unit 140 may be implemented as wheels or legs of the robot 100. To this end, the driving unit 140 may include a motor. The processor 130 may control various traveling operations such as the movement, stop, speed control, and direction change of the robot 100 by controlling the driving unit 140.

The memory 150 may store data necessary for various embodiments of the present disclosure. Specifically, the memory 150 may store the pre-processing model corresponding to the context information of the robot according to an embodiment of the present disclosure. For example, the memory 150 may store, in the form of a table, information on the pre-processing model based on the context information of the robot shown in FIG. 8.

The memory 150 may be implemented in a form of the memory 150 embedded in the robot 100 or in a form of the memory 150 detachable from the robot 100 based on a purpose of data storage. For example, the memory 150 embedded in the robot 100 may store data for driving the robot 100, and the memory 150 detachable from the robot 100 may store data for extended functions of the robot 100.

The memory 150 embedded in the robot 100 may be implemented as at least one of the volatile memory (for example, a dynamic random access memory (DRAM), a static RAM (SRAM), or a synchronous dynamic RAM (SDRAM)), the non-volatile memory (for example, an one time programmable read only memory (OTPROM), a programmable ROM (PROM), an erasable and programmable ROM (EPROM), an electrically erasable and programmable ROM (EEPROM), a mask ROM, or a flash ROM), a flash memory (for example, a NAND flash or a NOR flash), a hard drive, or a solid state drive (SSD)).

In addition, the memory 150 detachable from the robot 100 may be implemented in the form of a memory card (e.g., compact flash (CF), secure digital (SD), micro secure digital (Micro-SD), mini secure digital (Mini-SD), extreme digital (xD), or multi-media card (MMC)), or an external memory which may be connected to a universal serial bus (USB) port (for example, a USB memory 1).

The display 160 may display various data information. For example, the processor 130 may display information on a traveling path of the robot 100 through the display 160. The display 160 may be implemented as various types of displays such as a liquid crystal display (LCD), an organic light emitting diode (OLED) display, a quantum dot light-emitting diode (QLED) display, and a plasma display panel (PDP). The display 160 may also include a driving circuit, a backlight unit, and the like, which may be implemented in the form such as a thin film transistor (TFT), low temperature poly silicon (LTPS) TFT, or an organic TFT (OTFT). The display 160 may be implemented as a flexible display, a three-dimensional (3D) display, or the like.

The input/output interface 170 is a component used for the robot 100 to interact with the user, and the processor 130 may receive various information through the input/output interface 170. The input/output interface 170 may include at least one of a touch sensor, a motion sensor, a button, a jog dial, a switch, or a speaker, but is not limited thereto.

The communication interface 180 may input and output various types of data. Specifically, the processor 130 may communicate with an external server through the communication interface 180. Here, the processor 130 may transmit the context information of the robot to the external server through the communication interface 180. In addition, the processor 130 may receive the information on the pre-processing model corresponding to the context information of the robot from the external server through the communication interface 180.

To this end, the communication interface 180 may use a communication method such as an access point (AP) based wireless fidelity (Wi-Fi, i.e. wireless local area network (LAN)), a Bluetooth, a Zigbee, a wired/wireless local area network (LAN), a wide area network (WAN), Ethernet, an IEEE 1394, a high definition multimedia interface (HDMI), a USB, a mobile high-definition link (MHL), an audio engineering society/European broadcasting union (AES/EBU) communication, an optical communication or a coaxial communication.

Figure 13:
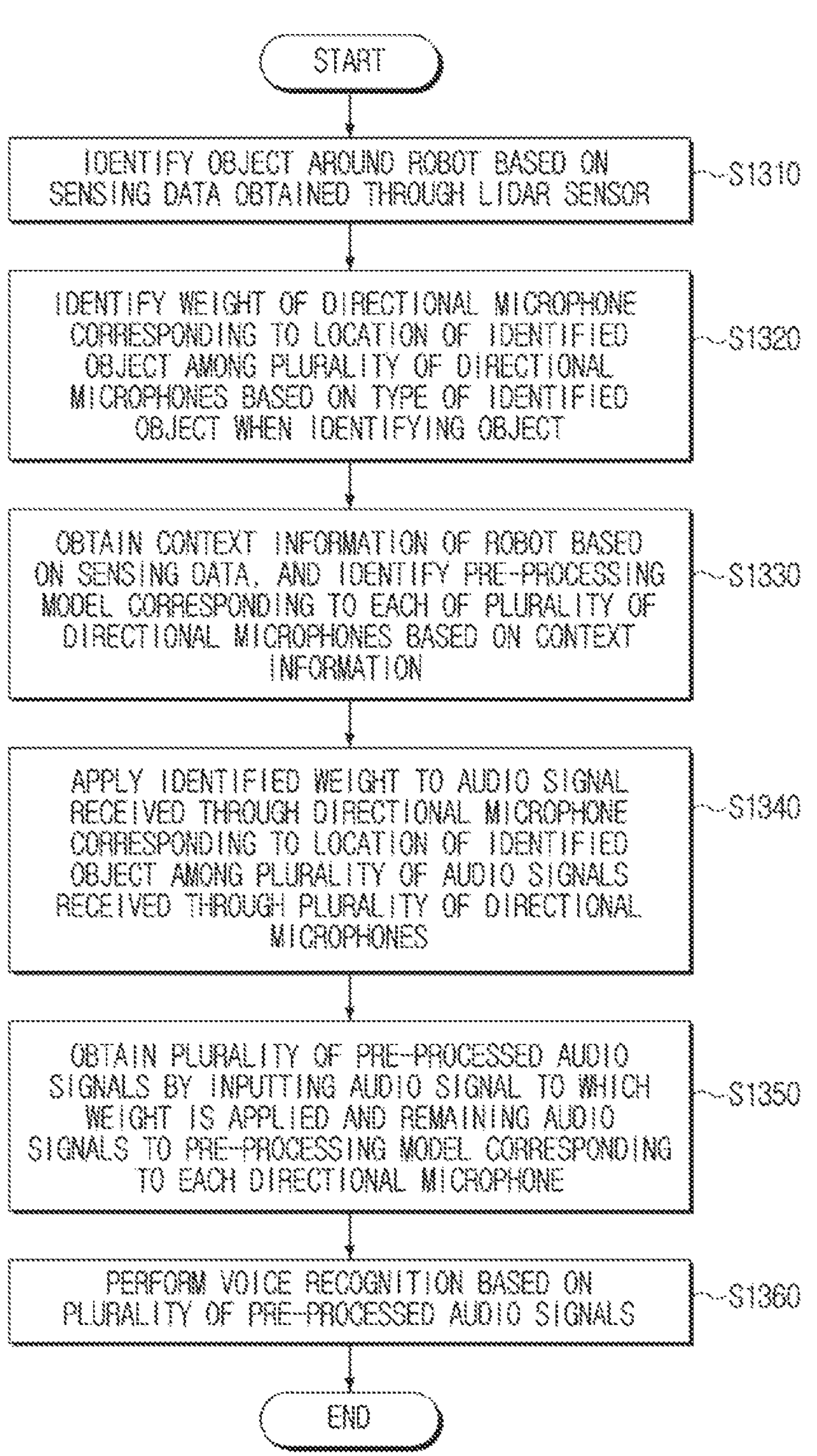
FIG. 13 is a flowchart schematically illustrating a control method of a robot according to another embodiment of the present disclosure.

FIG. 13 is a flowchart schematically illustrating a control method of the robot 100 according to another embodiment of the present disclosure.

Referring to FIG. 13, according to another embodiment of the present disclosure, the processor 130 may identify an object around a robot 100 based on sensing data obtained through a LiDAR sensor 110 (S1310).

Specifically, the processor 130 may identify whether an object exists around the robot 100 and a distance between the object and the robot based on a time taken for a laser irradiated through the LiDAR sensor 110 to be received through the LiDAR sensor 110 again.

The processor 130 may then identify a weight of a directional microphone corresponding to a location of the identified object among the plurality of directional microphones based on a type of the identified object when identifying the object (S1320).

Specifically, the processor 130 may identify whether an object exists within the directional range and angle of each directional microphone, and may identify the type of the identified object based on the sensing data. In addition, the processor 130 may identify the weight of the directional microphone corresponding to the directional range and angle including the location of the identified object among the plurality of directional microphones based on the type of the identified object.

The processor 130 may then obtain context information of the robot 100 based on the sensing data, and identify a pre-processing model corresponding to each of the plurality of directional microphones based on the context information (S1330).

Specifically, the processor 130 may identify the pre-processing model trained to pre-process an audio signal received through the microphone based on a surrounding environment of the robot 100. To this end, the processor 130 may obtain the context information of the robot 100 based on the sensing data, and identify the surrounding environment of the robot 100 based on the obtained context information. Here, the surrounding environment of the robot 100 may relate to a type of a space where the robot 100 is located, a type of object around the robot 100, the distance between the robot 100 and the object, a traveling state of the robot 100, or the like.

The processor 130 may identify the surrounding environment of the robot 100, and then identify the pre-processing model corresponding to the identified environment. Here, the processor 130 may identify the pre-processing models identified for the plurality of directional microphones as the same or different from each other based on the environment.

The processor 130 may then apply the identified weight to the audio signal received through the directional microphone corresponding to the location of the identified object among the plurality of audio signals received through the plurality of directional microphones (S1340), and obtain a plurality of pre-processed audio signals by inputting the audio signal to which the weight is applied and the remaining audio signals to the pre-processing model corresponding to each directional microphone (S1350).

In this way, the processor 130 may obtain a refined audio signal by appropriately pre-processing the audio signal that is distorted or includes some lost information by the surrounding environment of the robot 100.

The processor 130 may then perform voice recognition based on the obtained plurality of pre-processed audio signals (S1360).

In the above detailed description, operations S1310 to S1360 may be further divided into additional operations or combined into fewer operations, according to another embodiment of the present disclosure. In addition, some operations may be omitted as needed, and an order between the operations may be changed.

Methods according to the various embodiments of the present disclosure described above may be implemented in the form of applications which may be installed in a conventional robot.

In addition, the method according to the various embodiments of the present disclosure described above may be implemented only by software upgrade or hardware upgrade of the conventional robot.

In addition, the various embodiments of the present disclosure described above may be performed through an embedded server provided in the robot or at least one external server of the robot.

The various embodiments described above may be implemented in a computer or a computer-readable recording medium using software, hardware, or a combination of software and hardware. In some cases, the embodiments described in the present disclosure may be implemented by the processor itself. According to software implementation, the embodiments such as the procedures and functions described in the present disclosure may be implemented by separate software modules.

Each of the software modules may perform one or more functions and operations described in the specification.

A non-transitory computer-readable medium may store computer instructions for performing the processing operations of the robot 100 according to the various embodiments of the present disclosure described above. The computer instructions stored in the non-transitory computer-readable medium may allow a specific device to perform the processing operations of the robot 100 according to the various embodiments described above when the computer instructions are executed by a processor of the specific device.

The non-transitory computer-readable medium is not a medium that stores data therein for a while, such as a register, a cache, or a memory, and indicates a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

Although specific embodiments are shown and described in the present disclosure as above, embodiments of the present disclosure are not limited to the above-mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. A robot comprising:

a light detection and ranging (LiDAR) sensor;

a plurality of directional microphones;

memory storing instructions; and at least one processor configured to execute the instructions, wherein the instructions, when executed by the at least one processor, cause the robot to:

identify, based on sensing data obtained through the LiDAR sensor, an object in a vicinity of the robot, identify, based on a type of the object, a weight to apply to an audio signal received through a directional microphone corresponding to a location of the object from among the plurality of directional microphones, obtain context information of the robot based on the sensing data, the context information including first context information on a space in the vicinity of the robot and second context information on a driving state of the robot, identify, based on the first context information and the second context information, a pre-processing model corresponding to each directional microphone of the plurality of directional microphones, apply the weight to the audio signal received through the directional microphone corresponding to the location of the object among a plurality of audio signals received through the plurality of directional microphones, obtain a plurality of pre-processed audio signals by inputting the audio signal to which the weight has been applied, and a remainder of the plurality of audio signals other than the audio signal to which the weight has been applied, into the pre-processing model corresponding to the respective directional microphone, perform voice recognition based on the plurality of pre-processed audio signals, and control an operation of the robot based on a result of the voice recognition.

2. The robot of claim 1, wherein the instructions, when executed by the at least one processor, further cause the robot to:

based on identifying the object as a person, identify a first value as the weight to apply to the audio signal received through the directional microphone corresponding to the location of the object, and based on identifying the object as a wall, identify a second value as the weight to apply to the audio signal received through the directional microphone corresponding to the location of the object, and wherein the first value is greater than the second value.

3. The robot of claim 1, wherein the first context information comprises at least one of information on the type of the object, information on the location of the object, information on a number of objects in the vicinity of the robot, and information on a distance between the robot and the object, and wherein the second context information comprises at least one of information on whether the robot is traveling, information on a traveling speed of the robot, and information on a traveling direction of the robot.

4. The robot of claim 2, wherein the instructions, when executed by the at least one processor, further cause the robot to:

identify, based on the second context information, that the robot is traveling, and based on identifying that the robot is traveling, identify a pre-processing model comprising a first model as the pre-processing model corresponding to each directional microphone of the plurality of directional microphones.

5. The robot of claim 4, wherein the instructions, when executed by the at least one processor, further cause the robot to:

based on identifying that the robot is traveling toward the object identified as the person based on the first context information and the second context information, identify a pre-processing model comprising the first model and a second model as the pre-processing model corresponding to the directional microphone corresponding to the location of the object, obtain a first pre-processed audio signal by inputting the audio signal to which the weight of the first value is applied to the first model, and obtain a second pre-processed audio signal by inputting the first pre-processed audio signal to the second model.

6. The robot of claim 1, wherein the instructions, when executed by the at least one processor, further cause the robot to:

based on identifying, based on the first context information, the object as a wall adjacent to the robot, identify a pre-processing model comprising a third model as the pre-processing model corresponding to each directional microphone of the plurality of directional microphones.

7. The robot of claim 1, wherein the instructions, when executed by the at least one processor, further cause the robot to:

based on identifying a plurality of objects in the vicinity of the robot and the plurality of objects as a plurality of people based on the first context information, identify a pre-processing model comprising a fourth model as the pre-processing model corresponding to each directional microphone of the plurality of directional microphones.

8. A method of controlling a robot, the method comprising:

identifying, based on sensing data obtained through a light detection and ranging (LiDAR) sensor of the robot, an object in a vicinity of the robot;

identifying, based on a type of the object, a weight to apply to an audio signal received through a directional microphone of the robot corresponding to a location of the object from among plurality of directional microphones of the robot;

obtaining context information of the robot based on the sensing data, the context information including first context information on a space in the vicinity of the robot and second context information on a driving state of the robot;

identifying, based on the first context information and the second context information, a pre-processing model corresponding to each respective directional microphone of the plurality of directional microphones;

applying the weight to the audio signal received through the directional microphone corresponding to the location of the object among a plurality of audio signals received through the plurality of directional microphones;

obtaining a plurality of pre-processed audio signals by inputting the audio signal to which the weight has been applied, and a remainder of the plurality of audio signals other than the audio signal to which the weight has been applied, into the pre-processing model corresponding to the respective directional microphone;

performing voice recognition based on the plurality of pre-processed audio signals; and controlling an operation of the robot based on a result of the voice recognition.

9. The method of claim 8, wherein the identifying the weight further comprises:

based on identifying the object as a person, identifying a first value as the weight to apply to the audio signal received through the directional microphone corresponding to the location of the object; and based on identifying the object as a wall, identifying a second value as the weight to apply to the audio signal received through the directional microphone corresponding to the location of the object, and wherein the first value is greater than the second value.

10. The method of claim 9, wherein the first context information comprises at least one of information on the type of the object, information on the location of the object, information on a number of objects in the vicinity of the robot, and information on a distance between the robot and the object, and wherein the second context information comprises at least one of information on whether the robot is traveling, information on a traveling speed of the robot, and information on a traveling direction of the robot.

11. The method of claim 10, wherein the identifying the pre-processing model further comprises:

identifying, based on the second context information, that the robot is traveling; and identifying, based on identifying that the robot is traveling, a pre-processing model comprising a first model as the pre-processing model corresponding to each directional microphone of the plurality of directional microphones.

12. The method of claim 11, wherein the identifying the pre-processing model further comprises:

based on identifying that the robot is traveling toward the object identified as the person based on the first context information and the second context information, identifying a pre-processing model comprising the first model and a second model as the pre-processing model corresponding to the directional microphone corresponding to the location of the object, and wherein the obtaining the plurality of pre-processed audio signals further comprises:

obtaining a first pre-processed audio signal by inputting the audio signal to which the weight of the first value is applied to the first model; and obtaining a second pre-processed audio signal by inputting the first pre-processed audio signal to the second model.

13. The method of claim 8, wherein the identifying of the pre-processing model further comprises:

based on identifying that the object as a wall adjacent to the robot based on the first context information, identifying a pre-processing model comprising a third model as the pre-processing model corresponding to each directional microphone of the plurality of directional microphones.

14. A non-transitory computer readable medium having instructions stored therein, which when executed by a processor cause the processor to execute a method of controlling a robot, the method comprising:

identifying, based on sensing data obtained through a light detection and ranging (LiDAR) sensor of the robot, an object in a vicinity of the robot;

identifying, based on a type of the object, a weight to apply to an audio signal received through a directional microphone of the robot corresponding to a location of the object from among plurality of directional microphones of the robot;

obtaining context information of the robot based on the sensing data, the context information including first context information on a space in the vicinity of the robot and second context information on a driving state of the robot;

identifying, based on the first context information and the second context information, a pre-processing model corresponding to each respective directional microphone of the plurality of directional microphones;

applying the weight to the audio signal received through the directional microphone corresponding to the location of the object among a plurality of audio signals received through the plurality of directional microphones;

obtaining a plurality of pre-processed audio signals by inputting the audio signal to which the weight has been applied, and a remainder of the plurality of audio signals other than the audio signal to which the weight has been applied, into the pre-processing model corresponding to the respective directional microphone;

performing voice recognition based on the plurality of pre-processed audio signals; and controlling an operation of the robot based on a result of the voice recognition.

15. The non-transitory computer readable medium of claim 14, wherein the identifying the weight further comprises:

based on identifying the object as a person, identifying a first value as the weight to apply to the audio signal received through the directional microphone corresponding to the location of the object; and based on identifying the object as a wall, identifying a second value as the weight to apply to the audio signal received through the directional microphone corresponding to the location of the object, and wherein the first value is greater than the second value.

16. The non-transitory computer readable medium of claim 15, wherein the first context information comprises at least one of information on the type of the object, information on the location of the object, information on a number of objects in the vicinity of the robot, and information on a distance between the robot and the object, and wherein the second context information comprises at least one of information on whether the robot is traveling, information on a traveling speed of the robot, and information on a traveling direction of the robot, and, wherein the identifying the pre-processing model further comprises, identifying, based on the second context information, that the robot is traveling, and identifying, based on identifying that the robot is traveling, a pre-processing model comprising a first model as the pre-processing model corresponding to each directional microphone of the plurality of directional microphones.

17. The non-transitory computer readable medium of claim 16, wherein the identifying the pre-processing model further comprises:

based on identifying that the robot is traveling toward the object identified as the person based on the first context information and the second context information, identifying a pre-processing model comprising the first model and a second model as the pre-processing model corresponding to the directional microphone corresponding to the location of the object, and wherein the obtaining the plurality of pre-processed audio signals further comprises:

obtaining a first pre-processed audio signal by inputting the audio signal to which the weight of the first value is applied to the first model; and obtaining a second pre-processed audio signal by inputting the first pre-processed audio signal to the second model.

* * * * *